US009949301B2

(12) United States Patent
Freudiger et al.

(10) Patent No.: US 9,949,301 B2
(45) Date of Patent: Apr. 17, 2018

(54) METHODS FOR FAST, SECURE AND PRIVACY-FRIENDLY INTERNET CONNECTION DISCOVERY IN WIRELESS NETWORKS

(71) Applicant: Palo Alto Research Center Incorporated, Palo Alto, CA (US)

(72) Inventors: Julien F. Freudiger, Mountain View, CA (US); Alejandro E. Brito, Mountain View, CA (US); Shantanu Rane, Menlo Park, CA (US); Ersin Uzun, Campbell, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 151 days.

(21) Appl. No.: 15/002,160

(22) Filed: Jan. 20, 2016

(65) Prior Publication Data

US 2017/0208631 A1  Jul. 20, 2017

(51) Int. Cl.
*H04W 76/02* (2009.01)
*H04L 29/08* (2006.01)
(Continued)

(52) U.S. Cl.
CPC .............. *H04W 76/02* (2013.01); *H04L 9/30* (2013.01); *H04L 61/1511* (2013.01);
(Continued)

(58) Field of Classification Search
CPC ....... H04W 76/02; H04W 4/06; H04W 12/02; H04W 72/046; H04W 76/068; H04L 9/30;
(Continued)

(56) References Cited

U.S. PATENT DOCUMENTS

| 817,441 A | 4/1906 | Niesz |
| 4,309,569 A | 1/1982 | Merkle |
(Continued)

FOREIGN PATENT DOCUMENTS

| CA | 2534004 A1 * | 2/2005 | ............ H04W 48/18 |
| DE | 1720277 A1 | 6/1967 | |
(Continued)

OTHER PUBLICATIONS

Demir et al.: "Analysing the privacy policies of Wi-Fi trackers", Physical Analytics, ACM, 2 Penn Plaza, Suite 701 New York NY 10121-0701 USA, Jun. 11, 2014, pp. 39-44 *absrtact* *p. 41, paragraph 4-p. 43, paragraph 5*.
(Continued)

*Primary Examiner* — Obaidul Huq
(74) *Attorney, Agent, or Firm* — Shun Yao; Park, Vaughan, Felming & Dowler LLP

(57) ABSTRACT

A method and system for verifying Internet connectivity at an access point in a fast, secure, and privacy-friendly manner. During operation, the system may perform passive network discovery, challenge response discovery, and/or active discovery to verify Internet connectivity for a mobile device. Passive network discovery involves the mobile device using a public key of a server to decrypt a time value to verify Internet connectivity. The mobile device receives the encrypted time value as part of the server's signed timing information in an overloaded WiFi beacon frame. Challenge response discovery involves the mobile device sending an encrypted challenge to servers, and a server returns a correct response to the challenge to confirm Internet connectivity. Active discovery involves a mobile device sending HTTP GET requests to a randomly selected set of servers without including a user agent, and a server may send an HTTP REPLY to confirm Internet connectivity.

20 Claims, 11 Drawing Sheets

(51) Int. Cl.
*H04L 29/12* (2006.01)
*H04W 72/04* (2009.01)
*H04W 76/06* (2009.01)
*H04W 4/06* (2009.01)
*H04W 12/02* (2009.01)
*H04L 29/06* (2006.01)
*H04L 9/30* (2006.01)

(52) U.S. Cl.
CPC .......... *H04L 63/0421* (2013.01); *H04L 63/06* (2013.01); *H04L 67/02* (2013.01); *H04W 4/06* (2013.01); *H04W 12/02* (2013.01); *H04W 72/046* (2013.01); *H04W 76/068* (2013.01)

(58) Field of Classification Search
CPC . H04L 61/1511; H04L 63/0421; H04L 63/06; H04L 67/02
USPC .......................................... 370/310, 328, 329
See application file for complete search history.

(56) References Cited

U.S. PATENT DOCUMENTS

| | | |
|---|---|---|
| 4,921,898 A | 5/1990 | Lenney |
| 5,070,134 A | 12/1991 | Oyamada |
| 5,110,856 A | 5/1992 | Oyamada |
| 5,506,844 A | 4/1996 | Rao |
| 5,629,370 A | 5/1997 | Freidzon |
| 5,870,605 A | 2/1999 | Bracho |
| 6,052,683 A | 4/2000 | Irwin |
| 6,085,320 A | 7/2000 | Kaliski, Jr. |
| 6,091,724 A | 7/2000 | Chandra |
| 6,173,364 B1 | 1/2001 | Zenchelsky |
| 6,226,618 B1 | 5/2001 | Downs |
| 6,233,617 B1 | 5/2001 | Rothwein |
| 6,233,646 B1 | 5/2001 | Hahm |
| 6,332,158 B1 | 12/2001 | Risley |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,769,066 B1 | 7/2004 | Botros |
| 6,772,333 B1 | 8/2004 | Brendel |
| 6,862,280 B1 | 3/2005 | Bertagna |
| 6,901,452 B1 | 5/2005 | Bertagna |
| 6,917,985 B2 | 7/2005 | Madruga |
| 6,968,393 B1 | 11/2005 | Chen |
| 6,981,029 B1 | 12/2005 | Menditto |
| 7,013,389 B1 | 3/2006 | Srivastava |
| 7,031,308 B2 | 4/2006 | Garcia-Luna-Aceves |
| 7,061,877 B1 | 6/2006 | Gummalla |
| 7,152,094 B1 | 12/2006 | Jannu |
| 7,177,646 B2 | 2/2007 | ONeill |
| 7,206,860 B2 | 4/2007 | Murakami |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,362,727 B1 | 4/2008 | ONeill |
| 7,382,787 B1 | 6/2008 | Barnes |
| 7,430,755 B1 | 9/2008 | Hughes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,542,471 B2 | 6/2009 | Samuels |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,564,812 B1 | 7/2009 | Elliott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,769,887 B1 | 8/2010 | Bhattacharyya |
| 7,779,467 B2 | 8/2010 | Choi |
| 7,801,177 B2 | 9/2010 | Luss |
| 7,816,441 B2 | 10/2010 | Elizalde |
| 7,831,733 B2 | 11/2010 | Sultan |
| 7,908,337 B2 | 3/2011 | Garcia-Luna-Aceves |
| 7,924,837 B1 | 4/2011 | Shabtay |
| 7,953,885 B1 | 5/2011 | Devireddy |
| 8,000,267 B2 | 8/2011 | Solis |
| 8,010,691 B2 | 8/2011 | Kollmansberger |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,271,578 B2 | 9/2012 | Sheffi |
| 8,312,064 B1 | 11/2012 | Gauvin |
| 8,386,622 B2 | 2/2013 | Jacobson |
| 8,467,297 B2 | 6/2013 | Liu |
| 8,473,633 B2 | 6/2013 | Eardley |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,688,619 B1 | 4/2014 | Ezick |
| 8,699,350 B1 | 4/2014 | Kumar |
| 8,718,055 B2 | 5/2014 | Vasseur |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,862,774 B2 | 10/2014 | Vasseur |
| 8,868,779 B2 | 10/2014 | ONeill |
| 8,903,756 B2 | 12/2014 | Zhao |
| 8,934,496 B2 | 1/2015 | Vasseur |
| 8,937,865 B1 | 1/2015 | Kumar |
| 9,071,498 B2 | 6/2015 | Beser |
| 9,112,895 B1 | 8/2015 | Lin |
| 2002/0010795 A1 | 1/2002 | Brown |
| 2002/0038296 A1 | 3/2002 | Margolus |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0176404 A1 | 11/2002 | Girard |
| 2002/0188605 A1 | 12/2002 | Adya |
| 2002/0199014 A1 | 12/2002 | Yang |
| 2003/0033394 A1 | 2/2003 | Stine |
| 2003/0046437 A1 | 3/2003 | Eytchison |
| 2003/0048793 A1 | 3/2003 | Pochon |
| 2003/0051100 A1 | 3/2003 | Patel |
| 2003/0074472 A1 | 4/2003 | Lucco |
| 2003/0088696 A1 | 5/2003 | McCanne |
| 2003/0097447 A1 | 5/2003 | Johnston |
| 2003/0099237 A1 | 5/2003 | Mitra |
| 2003/0140257 A1 | 7/2003 | Peterka |
| 2003/0229892 A1 | 12/2003 | Sardera |
| 2004/0024879 A1 | 2/2004 | Dingman |
| 2004/0030602 A1 | 2/2004 | Rosenquist |
| 2004/0071140 A1 | 4/2004 | Jason |

(56) References Cited

U.S. PATENT DOCUMENTS

| | | |
|---|---|---|
| 2004/0073715 A1 | 4/2004 | Folkes |
| 2004/0139230 A1 | 7/2004 | Kim |
| 2004/0221047 A1 | 11/2004 | Grover |
| 2004/0225627 A1 | 11/2004 | Botros |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0074001 A1 | 4/2005 | Mattes |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0281288 A1 | 12/2005 | Banerjee |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0173831 A1 | 8/2006 | Basso |
| 2006/0193295 A1 | 8/2006 | White |
| 2006/0206445 A1 | 9/2006 | Andreoli |
| 2006/0215684 A1 | 9/2006 | Capone |
| 2006/0223504 A1 | 10/2006 | Ishak |
| 2006/0256767 A1 | 11/2006 | Suzuki |
| 2006/0268792 A1 | 11/2006 | Belcea |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0160062 A1 | 7/2007 | Morishita |
| 2007/0162394 A1 | 7/2007 | Zager |
| 2007/0171828 A1 | 7/2007 | Dalal |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255677 A1 | 11/2007 | Alexander |
| 2007/0255699 A1 | 11/2007 | Sreenivas |
| 2007/0255781 A1 | 11/2007 | Li |
| 2007/0274504 A1 | 11/2007 | Maes |
| 2007/0276907 A1 | 11/2007 | Maes |
| 2007/0294187 A1 | 12/2007 | Scherrer |
| 2008/0005056 A1 | 1/2008 | Stelzig |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0101357 A1 | 5/2008 | Lovanna |
| 2008/0107034 A1 | 5/2008 | Jetcheva |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0165775 A1 | 7/2008 | Das |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0250006 A1 | 10/2008 | Dettinger |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0298376 A1 | 12/2008 | Takeda |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0116393 A1 | 5/2009 | Hughes |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0285209 A1 | 11/2009 | Stewart |
| 2009/0287835 A1 | 11/2009 | Jacobson |
| 2009/0288143 A1 | 11/2009 | Stebila |
| 2009/0288163 A1 | 11/2009 | Jacobson |
| 2009/0292743 A1 | 11/2009 | Bigus |
| 2009/0293121 A1 | 11/2009 | Bigus |
| 2009/0300079 A1 | 12/2009 | Shitomi |
| 2009/0300407 A1 | 12/2009 | Kamath |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0058346 A1 | 3/2010 | Narang |
| 2010/0088370 A1 | 4/2010 | Wu |
| 2010/0094767 A1 | 4/2010 | Miltonberger |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0268782 A1 | 10/2010 | Zombek |
| 2010/0272107 A1 | 10/2010 | Papp |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0022812 A1 | 1/2011 | vanderLinden |

(56) References Cited

U.S. PATENT DOCUMENTS

| | | |
|---|---|---|
| 2011/0029952 A1 | 2/2011 | Harrington |
| 2011/0055392 A1 | 3/2011 | Shen |
| 2011/0055921 A1 | 3/2011 | Narayanaswamy |
| 2011/0060716 A1 | 3/2011 | Forman |
| 2011/0060717 A1 | 3/2011 | Forman |
| 2011/0090908 A1 | 4/2011 | Jacobson |
| 2011/0106755 A1 | 5/2011 | Hao |
| 2011/0145597 A1 | 6/2011 | Yamaguchi |
| 2011/0145858 A1 | 6/2011 | Philpott |
| 2011/0149858 A1 | 6/2011 | Hwang |
| 2011/0153840 A1 | 6/2011 | Narayana |
| 2011/0158122 A1 | 6/2011 | Murphy |
| 2011/0161408 A1 | 6/2011 | Kim |
| 2011/0202609 A1 | 8/2011 | Chaturvedi |
| 2011/0219427 A1 | 9/2011 | Hito |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265159 A1 | 10/2011 | Ronda |
| 2011/0265174 A1 | 10/2011 | Thornton |
| 2011/0271007 A1 | 11/2011 | Wang |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0036180 A1 | 2/2012 | Thornton |
| 2012/0047361 A1 | 2/2012 | Erdmann |
| 2012/0066727 A1 | 3/2012 | Nozoe |
| 2012/0106339 A1 | 5/2012 | Mishra |
| 2012/0114313 A1 | 5/2012 | Phillips |
| 2012/0120803 A1 | 5/2012 | Farkas |
| 2012/0127994 A1 | 5/2012 | Ko |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0314580 A1 | 12/2012 | Hong |
| 2012/0317307 A1 | 12/2012 | Ravindran |
| 2012/0331112 A1 | 12/2012 | Chatani |
| 2013/0024560 A1 | 1/2013 | Vasseur |
| 2013/0041982 A1 | 2/2013 | Shi |
| 2013/0044739 A1* | 2/2013 | Huang ............... H04W 52/0216 370/338 |
| 2013/0051392 A1 | 2/2013 | Filsfils |
| 2013/0060962 A1 | 3/2013 | Wang |
| 2013/0073552 A1 | 3/2013 | Rangwala |
| 2013/0074155 A1 | 3/2013 | Huh |
| 2013/0091539 A1 | 4/2013 | Khurana |
| 2013/0110987 A1 | 5/2013 | Kim |
| 2013/0111063 A1 | 5/2013 | Lee |
| 2013/0151584 A1 | 6/2013 | Westphal |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0182931 A1 | 7/2013 | Fan |
| 2013/0185406 A1 | 7/2013 | Choi |
| 2013/0191412 A1 | 7/2013 | Kitamura |
| 2013/0197698 A1 | 8/2013 | Shah |
| 2013/0198119 A1 | 8/2013 | Eberhardt, III |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227114 A1 | 8/2013 | Vasseur |
| 2013/0227166 A1 | 8/2013 | Ravindran |
| 2013/0242996 A1 | 9/2013 | Varvello |
| 2013/0250809 A1 | 9/2013 | Hui |
| 2013/0282854 A1 | 10/2013 | Jang |
| 2013/0282860 A1 | 10/2013 | Zhang |
| 2013/0282920 A1 | 10/2013 | Zhang |
| 2013/0304937 A1 | 11/2013 | Lee |
| 2013/0329696 A1 | 12/2013 | Xu |
| 2013/0336323 A1 | 12/2013 | Srinivasan |
| 2013/0339481 A1 | 12/2013 | Hong |
| 2013/0343408 A1 | 12/2013 | Cook |
| 2014/0003232 A1 | 1/2014 | Guichard |
| 2014/0006354 A1 | 1/2014 | Parkison |
| 2014/0006565 A1 | 1/2014 | Muscariello |
| 2014/0029445 A1 | 1/2014 | Hui |
| 2014/0032714 A1 | 1/2014 | Liu |
| 2014/0040505 A1 | 2/2014 | Barton |
| 2014/0040628 A1 | 2/2014 | Fort |
| 2014/0074730 A1 | 3/2014 | Arensmeier |
| 2014/0075567 A1 | 3/2014 | Raleigh |
| 2014/0082135 A1 | 3/2014 | Jung |
| 2014/0089454 A1 | 3/2014 | Jeon |
| 2014/0096249 A1 | 4/2014 | Dupont |
| 2014/0108474 A1 | 4/2014 | David |
| 2014/0115037 A1 | 4/2014 | Liu |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0173076 A1 | 6/2014 | Ravindran |
| 2014/0173110 A1* | 6/2014 | Uetabira ............... H04W 12/08 709/225 |
| 2014/0192717 A1 | 7/2014 | Liu |
| 2014/0195328 A1 | 7/2014 | Ferens |
| 2014/0195641 A1 | 7/2014 | Wang |
| 2014/0195666 A1 | 7/2014 | Dumitriu |
| 2014/0233575 A1 | 8/2014 | Xie |
| 2014/0237085 A1 | 8/2014 | Park |
| 2014/0245359 A1 | 8/2014 | DeFoy |
| 2014/0254595 A1 | 9/2014 | Luo |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0314093 A1 | 10/2014 | You |
| 2014/0337276 A1 | 11/2014 | Iordanov |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0039890 A1 | 2/2015 | Khosravi |
| 2015/0063802 A1 | 3/2015 | Bahadur |
| 2015/0089081 A1 | 3/2015 | Thubert |
| 2015/0095481 A1 | 4/2015 | Ohnishi |
| 2015/0095514 A1 | 4/2015 | Yu |
| 2015/0188770 A1 | 7/2015 | Naiksatam |
| 2015/0195149 A1 | 7/2015 | Vasseur |
| 2015/0207633 A1 | 7/2015 | Ravindran |

FOREIGN PATENT DOCUMENTS

| | | |
|---|---|---|
| DE | 19620817 A1 | 11/1997 |
| EP | 0295727 A2 | 12/1988 |

(56) References Cited

FOREIGN PATENT DOCUMENTS

| | | | |
|---|---|---|---|
| EP | 0757065 A2 | 7/1996 | |
| EP | 1077422 A2 | 2/2001 | |
| EP | 1384729 A1 | 1/2004 | |
| EP | 2124415 A2 | 11/2009 | |
| EP | 2214357 A1 | 8/2010 | |
| WO | 03005288 A2 | 1/2003 | |
| WO | 03042254 A1 | 5/2003 | |
| WO | 03049369 A2 | 6/2003 | |
| WO | 03091297 A1 | 11/2003 | |
| WO | 2007113180 A1 | 10/2007 | |
| WO | 2007144388 A1 | 12/2007 | |
| WO | 2011049890 A1 | 4/2011 | |
| WO | 2013123410 | 8/2013 | |

OTHER PUBLICATIONS

Musa et al.: "Tracking unmodified smartphones using wi-fi monitors", Embedded Network Sensor Systems, AMC, 2 Penn Plaza, Suite 701 New York NY 10121-0701 USA, Nov. 6, 2012, pp. 281-294 *absract* *p. 282, paragraph 2*.
Arkko et al.: "Network Discovery and Selection Problem; rfc5113.txt", Network Working Group RFC 1717, Internet Society (ISOC) 4, Rue Des Falaises CH-1205 Geneva, Switzerland, CH, Jan. 1, 2008 *the whole document*.
Jacobson, Van et al., "Content-Centric Networking, Whitepaper Describing Future Assurable Global Networks", Palo Alto Research Center, Inc., Jan. 30, 2007, pp. 1-9.
Koponen, Teemu et al., "A Data-Oriented (and Beyond) Network Architecture", SIGCOMM '07, Aug. 27-31, 2007, Kyoto, Japan, XP-002579021, p. 181-192.
Jacobson, Van et al. 'VoCCN: Voice Over Content-Centric Networks.' Dec. 1, 2009. ACM ReArch'09.
Rosenberg, J. "Interactive Connectivity Establishment (ICE): A Protocol for Network Address Translator (NAT) Traversal for Offer/Answer Protocols", Apr. 2010, pp. 1-117.
Shih, Eugene et al., 'Wake on Wireless: An Event Driven Energy Saving Strategy for Battery Operated Devices', Sep. 23, 2002, pp. 160-171.
Fall, K. et al., "DTN: an architectural retrospective", Selected areas in communications, IEEE Journal on, vol. 28, No. 5, Jun. 1, 2008, pp. 828-835.
Gritter, M. et al., 'An Architecture for content routing support in the Internet', Proceedings of 3rd Usenix Symposium on Internet Technologies and Systems, 2001, pp. 37-48.
"CCNx," http://ccnx.org/. downloaded Mar. 11, 2015.
"Content Delivery Network", Wikipedia, Dec. 10, 2011, http://en.wikipedia.org/w/index.php?title=Content_delivery_network&oldid=465077460.
"Digital Signature" archived on Aug. 31, 2009 at http://web.archive.org/web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.
"Pursuing a pub/sub internet (PURSUIT)," http://www.fp7-pursuit.ew/PursuitWeb/. downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
Detti, Andrea, et al. "CONET: a content centric inter-networking architecture." Proceedings of the ACM SIGCOMM workshop on Information-centric networking. ACM, 2011.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.
Afanasyev, Alexander, et al. "Interest flooding attack and countermeasures in Named Data Networking." IFIP Networking Conference, 2013. IEEE, 2013.
Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).
B. Ahlgren et al., 'A Survey of Information-centric Networking' IEEE Commun. Magazine, Jul. 2012, pp. 26-36.
"PBC Library-Pairing-Based Cryptography—About," http://crypto.stanford.edu/pbc. downloaded Apr. 27, 2015.
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM WKSHPS), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.
C. Gentry and A. Silverberg. Hierarchical ID-Based Cryptography. Advances in Cryptology—ASIACRYPT 2002. Springer Berlin Heidelberg (2002).
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
Boneh et al., "Collusion Resistant Broadcast Encryption With Short Ciphertexts and Private Keys", 2005.
D. Boneh and M. Franklin. Identity-Based Encryption from the Weil Pairing. Advances in Cryptology—CRYPTO 2001, vol. 2139, Springer Berlin Heidelberg (2001).
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {Aug. 2013,). Less pain,

(56) References Cited

OTHER PUBLICATIONS most of the gain: Incrementally deployable ICN. In ACM SIGCOMM Computer Communication Review (vol. 43, No. 4, pp. 147-158). ACM.
Anteniese et al., "Improved Proxy Re-Encryption Schemes with Applications to Secure Distributed Storage", 2006.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.
Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peer-to-Peer Overlays." NSDI. vol. 4. 2004.
Xiong et al., "CloudSeal: End-to-End Content Protection in Cloud-based Storage and Delivery Services", 2012.
Heckerman, David, John S. Breese, and Koos Rommelse. "Decision-Theoretic Troubleshooting." Communications of the ACM. 1995.
Heinemeier, Kristin, et al. "Uncertainties in Achieving Energy Savings from HVAC Maintenance Measures in the Field." ASHRAE Transactions 118.Part 2 {2012}.
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).
Hoque et al., 'NLSR: Named-data Link State Routing Protocol', Aug. 12, 2013, ICN 2013, pp. 15-20.
https://code.google.com/p/ccnx-trace/.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.
J. Bethencourt, A, Sahai, and B. Waters, 'Ciphertext-policy attribute-based encryption,' in Proc. IEEE Security & Privacy 2007, Berkeley, CA, USA, May 2007, pp. 321-334.
J. Hur, "Improving security and efficiency in attribute-based data sharing," IEEE Trans. Knowledge Data Eng., vol. 25, No. 10, pp. 2271-2282, Oct. 2013.
J. Shao and Z. Cao. CCA-Secure Proxy Re-Encryption without Pairings. Public Key Cryptography. Springer Lecture Notes in Computer Sciencevol. 5443 (2009).
V. Jacobson et al., 'Networking Named Content,' Proc. IEEE CoNEXT '09, Dec. 2009.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
L. Wang et al., 'OSPFN: An OSPF Based Routing Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
Gopal et al. "Integrating content-based Mechanisms with hierarchical File systems", Feb. 1999, University of Arizona, 15 pages.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.
Matocha, Jeff, and Tracy Camp. 'A taxonomy of distributed termination detection algorithms.' Journal of Systems and Software 43.3 (1998): 207-221.
Matteo Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.

(56) References Cited

OTHER PUBLICATIONS

Narasimhan, Sriram, and Lee Brownston. "HyDE—A General Framework for Stochastic and Hybrid Modelbased Diagnosis." Proc. DX 7 (2007): 162-169.

NDN Project [online], http://www.named-data.net/, Downloaded Mar. 9, 2015.

Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.

P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.

R. H. Deng, J. Weng, S. Liu, and K. Chen. Chosen-Ciphertext Secure Proxy Re-Encryption without Pairings. CANS. Spring Lecture Notes in Computer Science vol. 5339 (2008).

S. Chow, J. Weng, Y. Yang, and R. Deng. Efficient Unidirectional Proxy Re-Encryption. Progress in Cryptology —AFRICACRYPT 2010. Springer Berlin Heidelberg (2010).

S. Deering, "Multicast Routing in Internetworks and Extended LANs," Proc. ACM SIGCOMM '88, Aug. 1988.

S. Deering et al., "The PIM architecture for wide-area multicast routing," IEEE/ACM Trans, on Networking, vol. 4, No. 2, Apr. 1996.

S. Jahid, P. Mittal, and N. Borisov, "Easier: Encryption-based access control in social network with efficient revocation," in Proc. ACM ASIACCS 2011, Hong Kong, China, Mar. 2011, pp. 411-415.

S. Kamara and K. Lauter, "Cryptographic cloud storage," in Proc. FC 2010, Tenerife, Canary Islands, Spain, Jan. 2010, pp. 136-149.

S. Kumar et al. "Peacock Hashing: Deterministic and Updatable Hashing for High Performance Networking," 2008, pp. 556-564.

S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.

S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.

S.J. Lee, M. Gerla, and C. Chiang, "On-demand Multicast Routing Protocol in Multihop Wireless Mobile Networks," Mobile Networks and Applications, vol. 7, No. 6, 2002.

Sandvine, Global Internet Phenomena Report—Spring 2012. Located online at http://www.sandvine.com/downloads/ documents/Phenomenal H 2012/Sandvine Global Internet Phenomena Report 1H 2012.pdf.

Scalable and Adaptive Internet Solutions (SAIL) Project [online], http://sail-project.eu/ Downloaded Mar. 9, 2015.

Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.

Shani, Guy, Joelle Pineau, and Robert Kaplow. "A survey of point-based POMDP solvers." Autonomous Agents and Multi-Agent Systems 27.1 (2013): 1-51.

Sheppard, John W., and Stephyn GW Butcher. "A formal analysis of fault diagnosis with d-matrices." Journal of Electronic Testing 23.4 (2007): 309-322.

Shneyderman, Alex et al., 'Mobile VPN: Delivering Advanced Services in Next Generation Wireless Systems', Jan. 1, 2003, pp. 3-29.

Solis, Ignacio, and J. J. Garcia-Luna-Aceves. 'Robust content dissemination in disrupted environments.' proceedings of the third ACM workshop on Challenged networks. ACM, 2008.

Sun, Ying, and Daniel S. Weld. "A framework for model-based repair." AAAI. 1993.

T. Ballardie, P. Francis, and J. Crowcroft, "Core Based Trees (CBT)," Proc. ACM SIGCOMM '88, Aug. 1988.

T. Dierts, "The transport layer security (TLS) protocol version 1.2," IETF RFC 5246, 2008.

T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.

The Despotify Project (2012). Available online at http://despotify.sourceforge.net/.

V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.

V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.

V. K. Adhikari, S. Jain, Y. Chen, and Z.-L. Zhang. Vivisecting Youtube:An Active Measurement Study. In INFOCOM12 Mini-conference (2012).

Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.

Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).

Vutukury, Srinivas, and J. J. Garcia-Luna-Aceves. A simple approximation to minimum-delay routing. vol. 29. No. 4. ACM, 1999.

W.-G. Tzeng and Z.-J. Tzeng, "A public-key traitor tracing scheme with revocation using dynamic shares," in Proc. PKC 2001, Cheju Island, Korea, Feb. 2001, pp. 207-224.

Waldvogel, Marcel "Fast Longest Prefix Matching: Algorithms, Analysis, and Applications", A dissertation submitted to the Swiss Federal Institute of Technology Zurich, 2002.

Walker, Iain S. Best practices guide for residential HVAC Retrofits. No. LBNL-53592. Ernest Orlando Lawrence Berkeley National Laboratory, Berkeley, CA (US), 2003.

Wang, Jiangzhe et al.,"DMND: Collecting Data from Mobiles Using Named Data", Vehicular Networking Conference, 2010 IEEE, pp. 49-56.

Xylomenos, George, et al. "A survey of information-centric networking research." Communications Surveys & Tutorials, IEEE 16.2 (2014): 1024-1049.

Yi, Cheng, et al. 'A case for stateful forwarding plane.' Computer Communications 36.7 (2013): 779-791.

Yi, Cheng, et al. 'Adaptive forwarding in named data networking.' ACM SIGCOMM computer communication review 42.3 (2012): 62-67.

Zahariadis, Theodore, et al. "Trust management in wireless sensor networks." European Transactions on Telecommunications 21.4 (2010): 386-395.

Zhang, et al., "Named Data Networking (NDN) Project", http://www.parc.com/publication/2709/named-data-networking-ndn-project.html, Oct. 2010, NDN-0001, PARC Tech Report.

Zhang, Lixia, et al. 'Named data networking.' ACM SIGCOMM Computer Communication Review 44.3 {2014): 66-73.

Soh et al., "Efficient Prefix Updates for IP Router Using Lexicographic Ordering and Updateable Address Set", Jan. 2008, IEEE Transactions on Computers, vol. 57, No. 1.

Beben et al., "Content Aware Network based on Virtual Infrastructure", 2012 13th ACIS International Conference on Software Engineering.

Biradar et al., "Review of multicast routing mechanisms in mobile ad hoc networks", Aug. 16, Journal of Network and Computer Applications 35 (2012) 221-229.

D. Trossen and G. Parisis, "Designing and realizing and information-centric Internet," IEEE Communications Magazing, vol. 50, No. 7, pp. 60-67, Jul. 2012.

Garcia-Luna-Aceves et al., "Automatic Routing Using Multiple Prefix Labels", 2012, IEEE, Ad Hoc and Sensor Networking Symposium.

(56) References Cited

OTHER PUBLICATIONS

Gasti, Paolo et al., 'DoS & DDoS in Named Data Networking', 2013 22nd International Conference on Computer Communications and Networks (ICCCN), Aug. 2013, pp. 1-7.

Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.

J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.

J. Lotspiech, S. Nusser, and F. Pestoni. Anonymous Trust: Digit.

Kaya et al., "A Low Power Lookup Technique for Multi-Hashing Network Applications", 2006 IEEE Computer Society Annual Symposium on Emerging VLSI Technologies and Architectures, Mar. 2006.

S. Kamara and K. Lauter. Cryptographic Cloud Storage. Financial Cryptography and Data Security. Springer Berlin Heidelberg (2010).

RTMP (2009). Available online at http://wwwimages.adobe.com/ www.adobe.com/content/dam/Adobe/en/devnet/rtmp/ pdf/rtmp specification 1.0.pdf.

Hoque et al., "NLSR: Named-data Link State Routing Protocol", Aug. 12, 2013, ICN'13.

Nadeem Javaid, "Analysis and design of quality link metrics for routing protocols in Wireless Networks", PhD Thesis Defense, Dec. 15, 2010, Universete Paris-Est.

Wetherall, David, "Active Network vision and reality: Lessons form a capsule-based system", ACM Symposium on Operating Systems Principles, Dec. 1, 1999. pp. 64-79.

Kulkarni A.B. et al., "Implementation of a prototype active network", IEEE, Open Architectures and Network Programming, Apr. 3, 1998, pp. 130-142.

Xie et al. "Collaborative Forwarding and Caching in Content Centric Networks", Networking 2012.

Amadeo et al. "Design and Analysis of a Transport-Level Solution for Content-Centric VANETs", University "Mediterranea" of Reggio Calabria, Jun. 15, 2013.

Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).

Peter Dely et al. "OpenFlow for Wireless Mesh Networks" Computer Communications and Networks, 2011 Proceedings of 20th International Conference on, IEEE, Jul. 31, 2011 (Jul. 31, 2011), pp. 1-6.

Garnepudi Parimala et al "Proactive, reactive and hybrid multicast routing protocols for Wireless Mesh Networks", 2013 IEEE International Conference on Computational Intelligence and Computing Research, IEEE, Dec. 26, 2013, pp. 1-7.

Tiancheng Zhuang et al. "Managing Ad Hoc Networks of Smartphones", International Journal of Information and Education Technology, Oct. 1, 2013.

\* cited by examiner

METHODS FOR FAST, SECURE AND PRIVACY-FRIENDLY INTERNET CONNECTION DISCOVERY IN WIRELESS NETWORKS

FIELD

The present disclosure generally relates to Internet connection discovery. More specifically, the present disclosure relates to a method and system for determining Internet connectivity in a fast, secure, and privacy-friendly manner.

RELATED ART

When a mobile device user attempts to connect to a WiFi access point, the user faces a number of questions, such as: 1) Is the WiFi access point properly connected to the Internet? 2) Is the WiFi access point a captive portal? (e.g., require acceptance of Terms of Service (ToS)) 3) Does the user need to pay to use this WiFi access point? Currently, the user must first connect the mobile device to the access point in order to obtain an answer to these questions. Not only is this a cumbersome approach, but the mobile device also reveals information to third party servers in the process.

SUMMARY

One embodiment of the present invention provides a method for performing passive network discovery to verify Internet connectivity of a mobile device. During operation, the system (e.g., the mobile device) sets a timeout variable to a value equal to a current time. The system then receives a beacon frame from an access point of a WiFi service. The system determines that the beacon frame includes signed timing information of a server and the value of the timeout variable is less than a maximum time. The system may then determine a decrypted time value by using a public key of the server to decrypt an encrypted time value extracted from the signed timing information. The system may determine that the decrypted time value is equal to a time value extracted from the signed timing information and that the time value is greater than the current time minus a time window, and thereby determine that the Internet connectivity verification for the WiFi service is successful.

In one variation on this embodiment, the access point obtains the signed timing information from the server and broadcasts the signed timing information in the beacon frame.

In one variation on this embodiment, the system may perform challenge response discovery. The system sets the timeout variable to a value equal to the current time. The system then selects a subset of servers from a stored list of servers. The system may send a challenge request to the access point using a probe request frame. The probe request frame includes a number encrypted using a public key of a respective server of the subset of servers. The access point may forward the challenge request to the subset of servers. A respective server of the subset of servers may apply a function indicated in the challenge request to the number indicated in the challenge request to generate an encrypted value to be included in a result message returned to the access point. The access point may forward the result message to the mobile device after receiving the result message from the respective server. The system may determine, based on the encrypted value in the result message, that the Internet connection has been successfully verified.

In a further variation, the access point removes user agent information from the challenge request.

In a variation on this embodiment, the system performs challenge response discovery. The system (e.g., mobile device) may send a request to perform a DNS lookup to a DNS server via the access point. The request includes a domain name encrypted using a public key of the DNS server. The access point may forward the request to the DNS server. The DNS server decrypts the encrypted domain name, determines a numeric IP address corresponding to the domain name, and sends the numeric IP address to the access point for forwarding to the mobile device. The mobile device may determine that the Internet connection has been successfully verified based on receiving the numeric IP address.

In a variation on this embodiment, the system performs active discovery. The system (e.g., mobile device) may set the timeout variable to a value equal to the current time. The system may randomly select a subset of servers from a plurality of servers. The system sends a HTTP GET request without including a user agent to each server of the randomly selected subset of servers via the access point. The access point may forward the HTTP GET request to each server of the randomly selected subset of servers. A respective server may send an HTTP REPLY to the access point and the access point forwards the HTTP REPLY to the mobile device. The system may determine that the Internet connectivity verification is successful based on receiving the HTTP REPLY and the value of the timeout being less than a maximum time.

In a variation on this embodiment, the beacon frame comprises the signed timing information of the server, terms of service, and a Uniform Resource Locator (URL) for a payment website.

In a variation on this embodiment, the server publishes signed timing information at regular intervals.

BRIEF DESCRIPTION OF THE FIGURES

In the figures, like reference numerals refer to the same figure elements.

DETAILED DESCRIPTION

Figure 1:
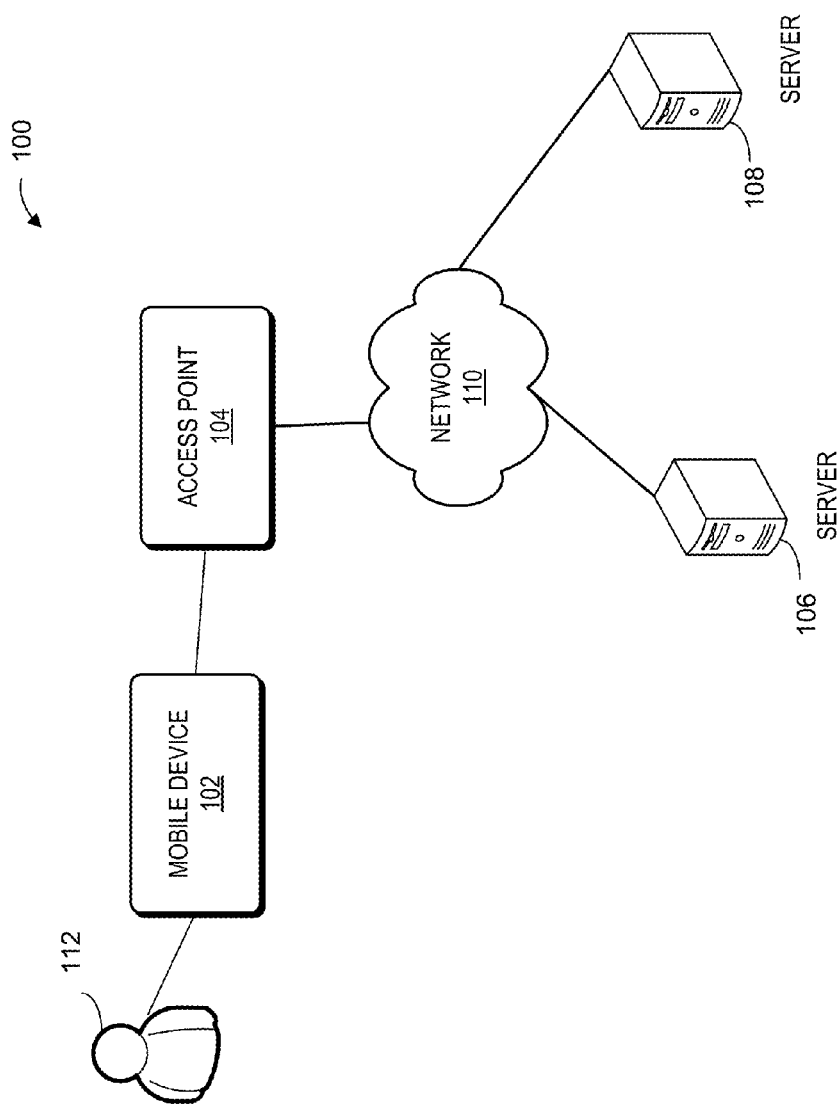
FIG. 1 presents a diagram illustrating an exemplary Internet connectivity verification system, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Overview

Embodiments of the present invention solve the problem of verifying Internet connectivity at an access point by providing multiple techniques for a mobile device to determine Internet connectivity in a fast, secure and privacy-friendly manner. An Internet connectivity verification system may include a mobile device, an access point, and one or more servers configured to support various techniques for verifying Internet connectivity. This disclosure describes these multiple techniques for verifying Internet connectivity, including passive network discovery, challenge response discovery, and active discovery with set diversity.

Passive network discovery allows a mobile device to verify Internet connectivity without sending any messages. A server may publish signed timing information at regular intervals that includes an encrypted time value. The access point overloads WiFi beacon frames to include the signed timing information, as well as terms of service and a link to a payment website. The mobile device may receive the beacon frame and decrypt the encrypted time value using the server's public key. If the decryption is successful and the time value is sufficiently recent, then the Internet verification is a success.

Challenge response discovery allows a mobile device to use WiFi probe requests to challenge access points and/or servers to prove Internet connectivity before establishing an Internet connection. The access point forwards the challenge request to one or more servers. A server may perform the challenge and send the result to the access point, and the access point sends the challenge result with terms of service and payment website data back to the mobile device. The mobile device confirms the server has successfully performed the challenge and thereby verifies Internet connectivity.

Active discovery allows a mobile device to send HTTP GET requests to multiple randomly selected servers from a crowdsourced pool of Internet connectivity servers, and receive HTTP REPLY messages from the multiple servers to verify Internet connectivity.

Internet Connectivity Discovery

Currently, a mobile device may connect to a WiFi access point and attempt to fetch known content from a static server on the Internet using an HTTP GET request. The goal of this request is to verify Internet connectivity. This method is used across mobile operating systems (e.g., iOS and Android), as well as computer operating systems (e.g., Windows, Mac OS X).

If the access point is a captive portal, the access point intercepts the request and redirects the mobile device to a web server that provides a webpage describing the ToS and optional payment details. In practice, the access point operates as a firewall that intercepts HTTP GET queries and forwards them to a redirect server. This redirect server responds with a regular HTTP response, which contains HTTP status code 302 to redirect the client to the captive portal. The portal usually resides in a company's Intranet. To the client, this process is totally transparent.

The access point may transmit the original HTTP GET request to the static server only after the user accepts the ToS and possibly register for the service, and the mobile device may receive a reply. If the reply matches the expected content, a mobile device can assume that network connectivity is available.

Third parties such as Apple, Google, and Microsoft operate these static servers. Whenever a mobile device checks for network connectivity, the mobile device leaks its IP address, time of connection, and sometimes user agent to those static servers. For example, every time an Android device joins a network, the device sends an HTTP GET request to 74.125.239.99 or 74.125.239.100. A reverse IPv4 lookup reveals that both of these IP addresses resolve to Google.

The following is an example of an outgoing HTTP GET request from an Android 4.2.2 mobile phone:

```
----HTTP-REQUEST-START----
GET /generate_204 HTTP/1.1
User-Agent: Dalvik/1.6.0 (Linux; U; Android 4.2.2; Nexus S
Build/JDQ39E)
Host: 74.125.239.99
Connection: Keep-Alive
Accept-Encoding: gzip
-----HTTP-REQUEST-END-----
```

An example reply is as follows:

```
----HTTP-REPLY-START----
HTTP/1.1 204 No Content
Content-Length: 0
Content-Type: text/html; charset=UTF-8
Date: Wed, 21 Aug 2013 18:25:31 GMT
Server: GFE/2.0
-----HTTP-REPLY-END-----
```

Google may learn information about users when the users join a WiFi network. A mobile device may reveal its IP address, the time of connection, and its user agent containing a phone's build version, Android version and model (e.g., "User-Agent: Dalvik/1.6.0 (Linux; U; Android 4.2.2; Nexus S Build/JDQ39E)"). The user agent is a short string that web browsers and other applications send to identify themselves to web servers. Note that no cookie information is transmitted and that user agents are not systematically transmitted.

This applies to any device that uses automatic network discovery, such as mobile phones (e.g., iPhone, Android, Windows), laptops and other personal computers equipped with WiFi capability.

One can perform a reverse geo-location lookup of an IP address to obtain the approximate location associated with the IP address, and thus that of the user behind the IP address. These reverse lookups are increasingly precise, usually giving zip code level information. In other words, it might be possible for network connectivity servers to learn a user's location in detail.

In summary, conventional Internet connectivity discovery process is slow, affects privacy, and is not secure. The conventional process is slow since users must connect to an access point before the users can discover connectivity details. The conventional process also affects privacy as users must reveal some information in the process, and the conventional process is not secure, since all messages are exchanged in plaintext.

The disclosure below describes a system that overcomes many of the disadvantages found in the conventional process. In particular, with the passive network discovery technique illustrated in FIG. 3A, the system (e.g., a mobile device) may employ a fully passive method to verify Internet connectivity prior to association with an access point. With the challenge response discovery technique illustrated in FIGS. 5A-5B, the system may include a challenge in WiFi probe requests to obtain Internet connectivity proofs while still preserving privacy and improving security guarantees about Internet connectivity proofs. With the active discovery with set diversity technique illustrated in FIG. 6, the system may protect the privacy of end users with respect to static Internet servers used in Internet connectivity discovery.

With these techniques, it is possible for end users to verify Internet connectivity faster, more securely, and without compromising their privacy. The disclosed techniques can be automated, and only require small changes to the WiFi 802.11 specification on mobile handsets and access points. In addition, the disclosed technique for advertising the captive portal is harder to circumvent by a malicious client, since there is no need for redirection.

Exemplary Internet Connectivity Verification System

FIG. 1 presents a diagram illustrating an exemplary Internet connectivity verification system 100, in accordance with an embodiment of the present invention. Internet connectivity verification system 100 may include a mobile device 102 using (e.g., communicating with or accessing) an access point 104 to communicate with one or more servers 106-108 over a network 110. The mobile device 102 can be any computing device, such as a cell phone, a laptop, a videogame console, or any other computing device with the hardware and/or software to connect to the Internet wirelessly.

Access point 104 provides wireless access to a network, such as the Internet, using a wireless standard such as IEEE 802.11. The access point can be a networking hardware device that allows mobile devices to connect to a wired network using Wi-Fi or related standards. The access point may be a standalone device connected to a router, or the access point can also be an integral component of the router.

A user 112 may operate mobile device 102 to attempt to access the Internet. Mobile device 102 may communicate with servers 106-108 in order to verify Internet connectivity. There may be one or more components installed on mobile device 102 to perform operations to verify Internet connectivity.

Servers 106-108 may represent a set of servers $S=\{S_1, \ldots, S_n\}$ that are accessible on the Internet and help verify Internet connectivity. In some embodiments, the servers do not collude (e.g., do not share information with each other). The servers may be DNS servers, web servers, or any other type of server. For example, $S_1$ can be a Microsoft Network Connectivity Status Indicator (NCSI) server. Individuals can operate servers as well. The mobile device can obtain and store data regarding a subset of S. Although two servers are depicted in FIG. 1, there can be any number of servers available to help verify Internet connectivity.

A server may include web server software to accept and respond to HTTP requests from clients. A server may also include software, hardware, and/or a combination of hardware and software that facilitate the various techniques disclosed herein for verifying Internet connectivity. For example, the server may include software and/or hardware components to publish digitally signed timing information, to manage a public key and a private key of the server associated with a public key infrastructure, and/or to respond to challenge requests.

Verifying Internet Connectivity

Figure 2:
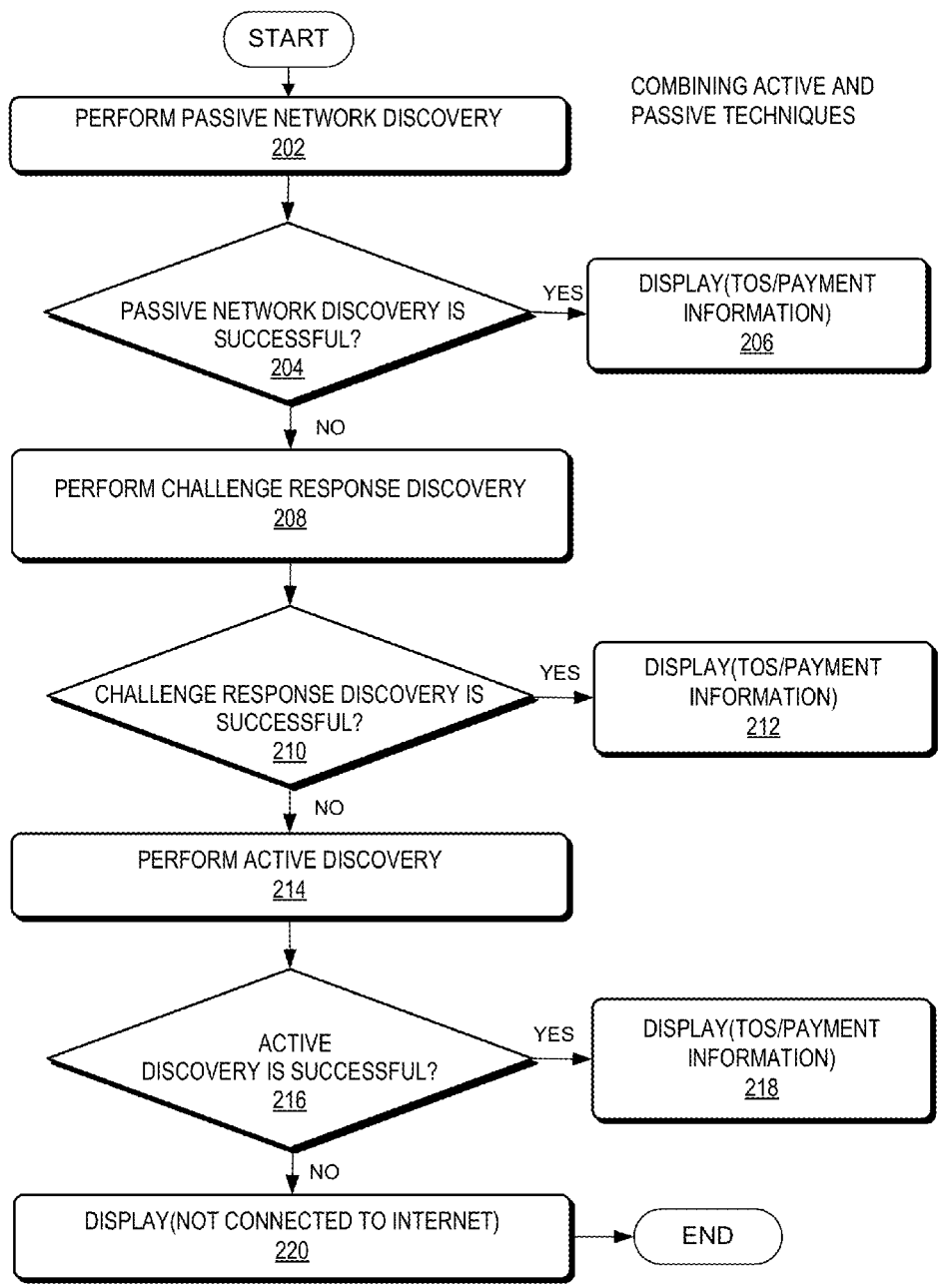
FIG. 2 presents a flow chart illustrating an exemplary process for verifying Internet connectivity using a combination of active and passive techniques, in accordance with an embodiment of the present invention.

FIG. 2 presents a flow chart illustrating an exemplary process for verifying Internet connectivity using a combination of active and passive techniques, in accordance with an embodiment of the present invention. The depicted process represents a generalized protocol that combines the advantages of the different schemes presented in FIG. 3-FIG. 6. Embodiments of the present invention are not limited to the operations depicted in FIG. 2, and some embodiments may perform the operations of FIG. 2 in a different order or with operations that vary from that depicted in FIG. 2.

As depicted in FIG. 2, the system may initially perform passive network discovery (operation 202). For example, the system may perform passive network discovery as illustrated in FIG. 3. The system may determine whether the passive network discovery is successful (operation 204). If successful, the system has verified Internet connectivity and the system may display the terms of service and payment information (operation 206). The user may then use online services after agreeing to the terms of service and making the payment.

Figure 5A:
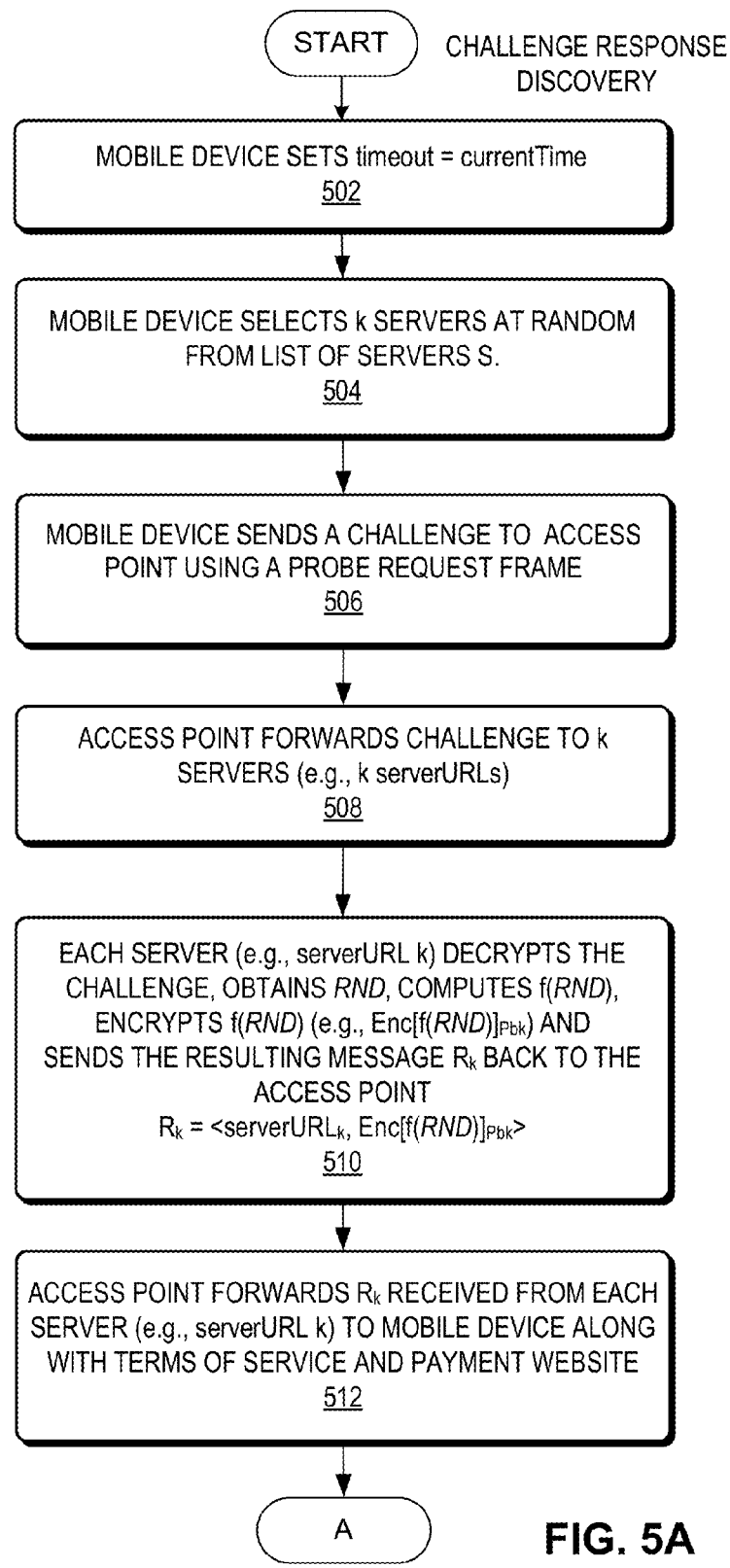
FIGS. 5A-5B presents a flow chart illustrating an exemplary process for challenge response discovery, in accordance with an embodiment of the present invention.
Figure 5B:
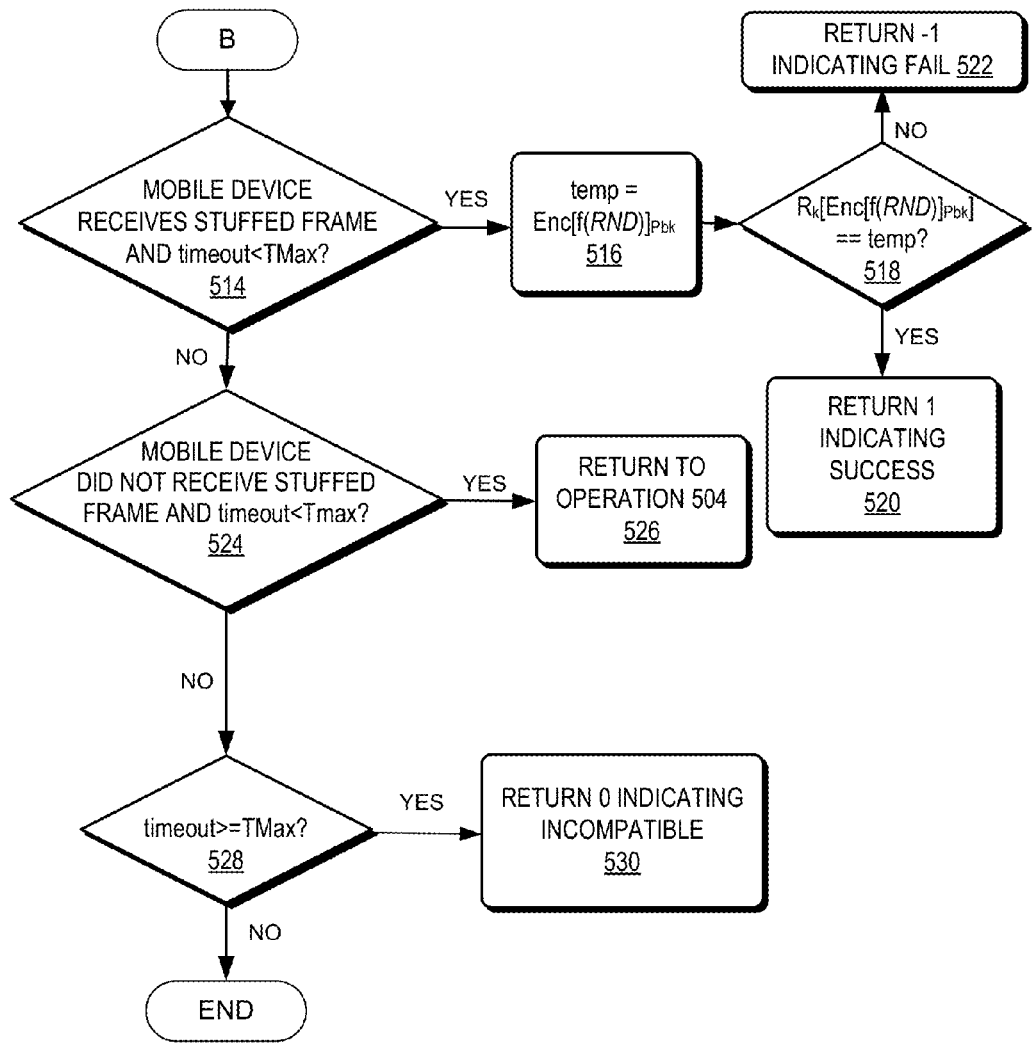

If passive network discovery is unsuccessful (e.g., incompatible result), the system may perform challenge response discovery (operation 208). For example, the system may perform challenge response discovery as illustrated in FIGS. 5A-5B. If the system determines that challenge response discovery is successful (operation 210), the system has verified Internet connectivity and the system displays the terms of service and payment information (operation 212). The user may use online services after agreeing to the terms of service and making a payment.

If challenge response discovery is unsuccessful (e.g., incompatible result), the system may perform active discovery (operation 214). For example, the system may perform active discovery as illustrated in FIGS. 5A-5B. The system may determine whether active discovery is successful (operation 216). If successful, the system has successfully verified Internet connectivity and the system displays the terms of service and payment information (operation 218). A user may use online sources after agreeing to the terms of service and making payment.

If active discovery is unsuccessful (e.g., incompatible), the system may display information indicating that the mobile device is not connected to the Internet and terminate or restart attempts to connect to the Internet in response to user input (operation 220).

Pseudocode representing the operations of FIG. 2 are as follows:

---

Input: S, k, TMax, TWindow, f( )
Output: ToS/Payment information or not connected
Switch passiveDiscovery(S, k, TMax, TWindow):
    Case 1:// Connected to the Internet
        Display(ToS/payment information)
        Quit( )
    Case 0: //incompatible with passive discovery
        switch challengeResponseDiscovery(S, k, f( ), TMax):
            Case 1: // connected to the Internet
                Display(ToS/Payment Information)
                Quit( )
            Case 0: //incompatible with challenge response discovery
                If activeDiscovery(S, k, TMax) then
                    // connected to the Internet
                    Display(ToS/Payment Information)
Display(Not connected to Internet)

---

Passive Network Discovery

Figure 3A:
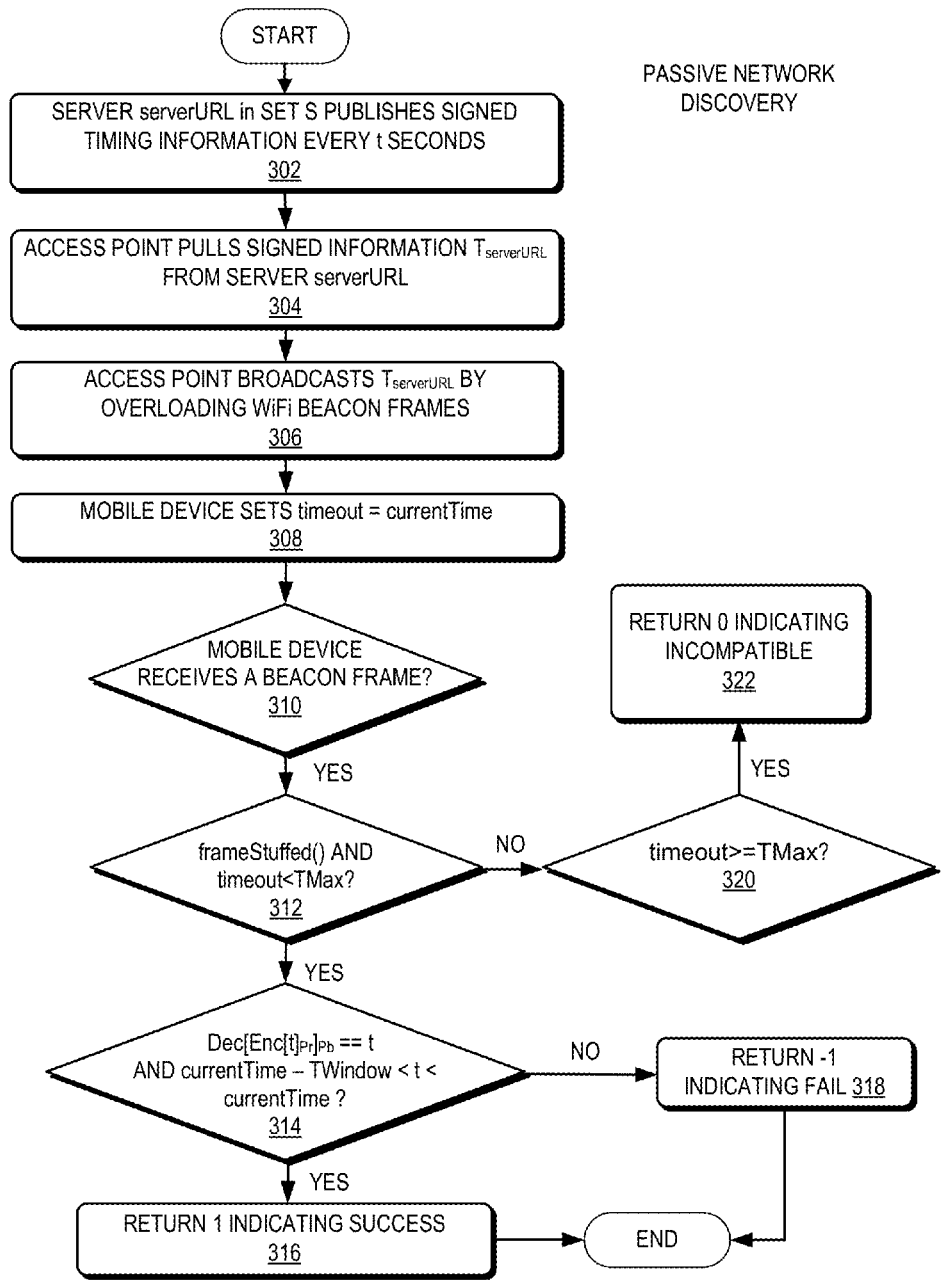
FIG. 3A presents a flow chart illustrating an exemplary process for passive network discovery, in accordance with an embodiment of the present invention.

FIG. 3A presents a flow chart illustrating an exemplary process for passive network discovery, in accordance with an embodiment of the present invention. Embodiments of the present invention are not limited to the operations depicted in FIG. 3A, and some embodiments may perform the operations of FIG. 3A in a different order or with operations that vary from that depicted in FIG. 3A

Figure 3B:
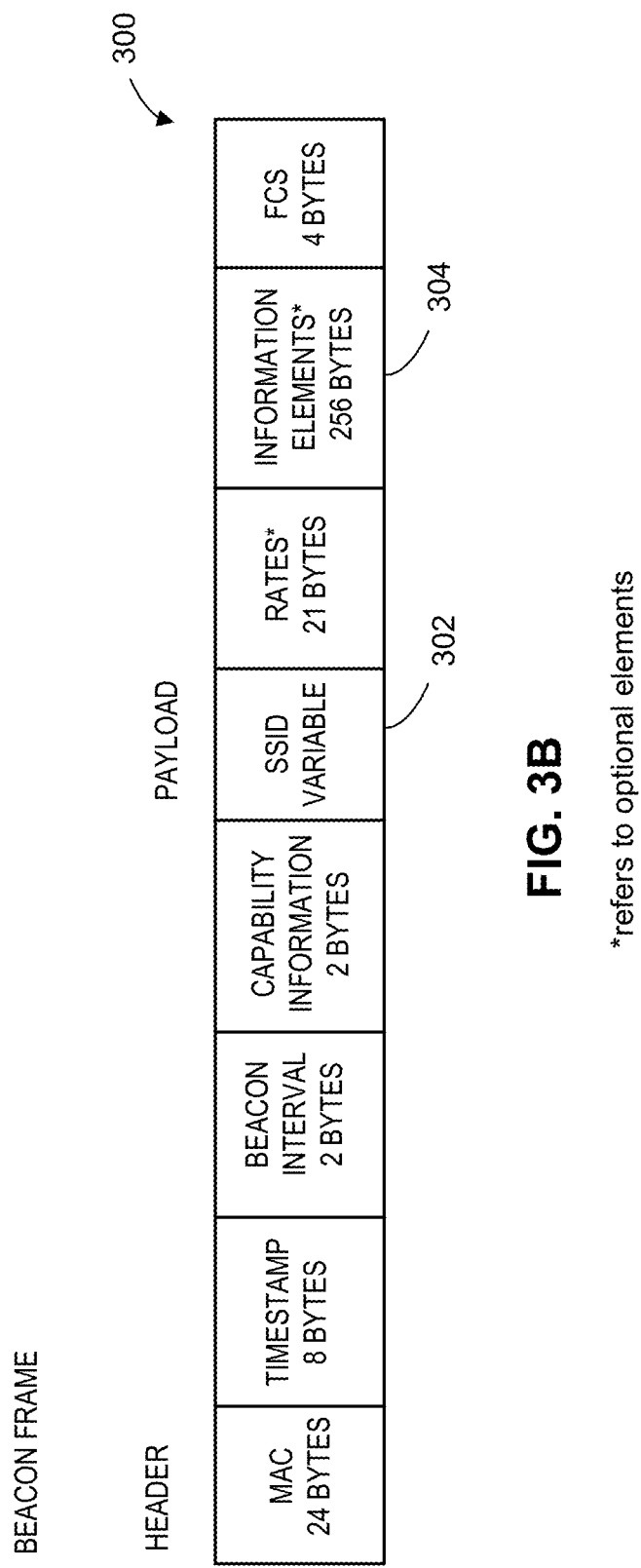
FIG. 3B illustrates an exemplary beacon frame with a header and payload.

This technique uses IEEE 802.11 management frames, such as beacon frames, to inform users about network status. FIG. 3B illustrates an exemplary beacon frame 300 with a header and payload. Access points may send beacon frames at regular intervals (e.g., every 100 ms) to advertise their presence to mobile devices. The shorter the interval is, the faster the speed of association between the mobile device and the access point. However, a short interval also means lower available bandwidth and the system may need to reduce the size of beacon packets. As a result, the inventors seek solutions that do not incur a large overhead of beacon formats.

It is possible to overload beacons with extra information. For example, the system may use unused bytes of an SSID field 302, or an optional Information Elements field 304 to share additional data. The system may make use of the available space to add about 280 bytes of information, and minimize the overall overhead.

With the passive network discovery technique, messages from an access point implicitly inform the user about Internet connectivity. The access points may add a ToS and a link to a payment website into a WiFi beacon frame. In other words, a mobile device can make an informed decision prior to connecting to the access point and without having to send any messages.

The input to this technique may include a set of servers S, a server k, a maximum timeout time period TMax, and a time window TWindow. The output of this technique may include 1 indicating success, −1 indicating failure, or 0 indicating incompatible result.

As depicted in FIG. 3A, a server k (e.g., represented by serverURL) in set S may publish signed timing information at regular intervals (e.g., every t seconds) (operation 302). The signed timing information can be $T_{serverURL}$=<serverURL, t, $P_b$, Enc[t]$_{Pr}$>, where serverURL is a URL serving as the server identifier, $P_b$ is serverURL's public key, $P_r$ is serverURL's private key, and Enc[t]$_{Pr}$ is the encryption of the current time t with private key $P_r$. The access point pulls (e.g., obtains or retrieves) signed information $T_{serverURL}$ from the server associated with serverURL (operation 304). The access point may broadcast $T_{serverURL}$ by overloading WiFi beacon frames to include ToS, proof of connectivity (e.g., $T_{serverURL}$) and a link to a payment website (e.g. captive portal) (operation 306). For example, Beacon=$T_{serverURL}$‖ToS‖paymentURL. The double vertical lines indicate that a beacon includes $T_{serverURL}$, ToS, and paymentURL, although in some embodiments the ToS and paymentURL are optional.

The mobile device may then set timeout=currentTime (operation 308). Note that the symbol currentTime represents the current time at the time of performing an operation.

The mobile device may listen on a WiFi network. If the mobile device receives a beacon frame (operation 310), the mobile device performs the following process:

---

If frameStuffed( ) and (timeout<TMax) then
    If Dec[Enc[t]$_{Pr}$]$_{Pb}$ == t and currentTime − TWindow < t < currentTime
    then
        Return 1 //Success
    Else
        Return −1 //Fail
Else If (timeout>=TMax)
    Return 0 // Incompatible

---

As illustrated in FIG. 3A, if the mobile device receives a beacon frame, then the mobile device determines if frameStuffed( ) returns a true value and timeout<TMax (operation 312). In some embodiments, a function frameStuffed( ) may return a true value if the WiFi beacon frame includes the signed timing information $T_{serverURL}$. If frameStuffed( ) evaluates to a true value and timeout<TMax, then the mobile device determines if Dec[Enc[t]$_{Pr}$]$_{Pb}$==t and currentTime−TWindow<t<currentTime (operation 314). Dec[Enc[t]$_{Pr}$]$_{Pb}$ represents a value obtained when using a public key of the server to decrypt an encrypted time value, where the time value is encrypted by the server using the corresponding private key of the server. That is, the mobile device may extract the time value t encrypted by the server from the signed timing information, and decrypt the encrypted time value. If Dec[Enc[t]$_{Pr}$]$_{Pb}$==t and currentTime−TWindow<t<currentTime then the Internet connectivity verification is successful and, in some embodiments, the method (e.g., procedure or function) may return a value of 1 to indicate success (operation 316). Note that current-Time−TWindow<t<currentTime is true if the time value t is sufficiently recent so as to be within a predetermined threshold indicated by the time window.

Otherwise, if Dec[Enc[t]$_{Pr}$]$_{Pb}$==t and currentTime−TWindow<t<currentTime are not both true then the method is unsuccessful and, in some embodiments, the method (e.g., procedure or function) may return a value of −1 to indicate failure (operation 318).

If frameStuffed( ) and timeout<TMax are not both true, then the mobile device determines whether timeout>=TMax (operation 320). If timeout>=TMax then the method (e.g., procedure or function) may return a value of 0 to indicate an incompatible result (operation 322).

With this technique, the server's encryption of the timing information guarantees security. User privacy is guaranteed as the mobile devices do not have to send any messages to verify connectivity information. Among the three techniques, passive network discovery provides the best trade-off of security, privacy and speed. TWindow is a parameter indicating how permissible the mobile device is with respect to the freshness (e.g., temporal proximity) of the delivered signature. For example, a device with a more strict security policy can set TWindow to a low value, and demand valid proof of Internet connectivity from the last 5 seconds. A device with a more relaxed security policy may only require proof from the last hour. In some embodiments, the system may use RSA signatures (e.g., 2048 bits) or Elliptic Curve Digital Signature Algorithm (ECDSA) to lessen the overhead (e.g., 256 bits). Both fit into the 256B information elements field of beacon frames.

In some embodiments, the system may leverage keyed-hash message authentication codes (HMACs). Assume that a mobile device and a server s in S share a secret key K. This could be done using traditional key establishment techniques between the mobile device and the server s (e.g., such as Diffie-Hellman in Transport Layer Security (TLS) Protocol Version 1.2). For example, a user logged into Facebook may share such a secret with Facebook. The server can then generate <server, $HMAC(t)_K$>. The access point forwards such messages in its beacon frames. If a mobile device with secret key K can verify the HMAC, then the mobile device has confirmation that there is Internet connectivity.

In some embodiments, the system may leverage the stuffing of WiFi beacons to communicate a WiFi password to a mobile device. The mobile device can then use the password to establish a secret key with the access point and obtain an encrypted Wi-Fi Protected Access (WPA) network. This defeats eavesdropping by passive adversaries.

Challenge Response Discovery

Figure 4:
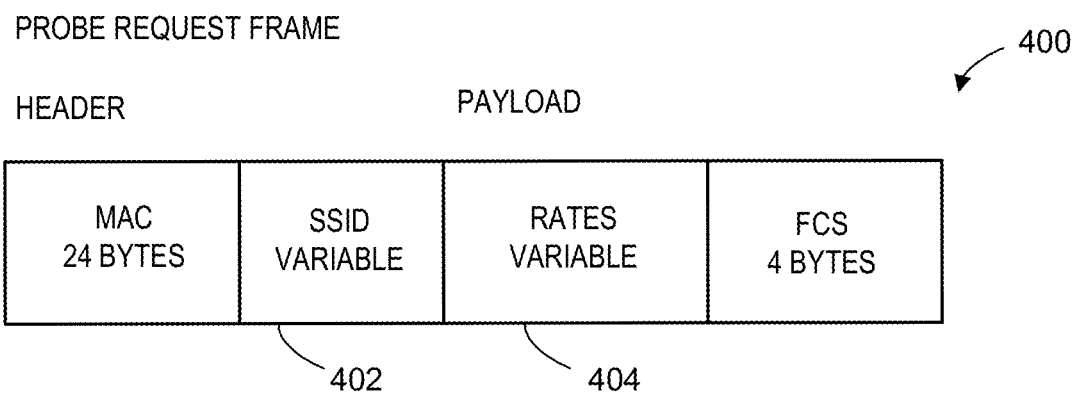
FIG. 4 illustrates an exemplary probe request frame with a header and a payload.

FIG. 4 illustrates an exemplary probe request frame 400 with a header and a payload that the system uses to perform the challenge response discovery technique. The probe request frame may include a MAC field that is 24 bytes in size, an SSID field 402 that is of variable size, a rates field 404 that is of variable size, and an FCS field that is 4 bytes in size. The challenge response discovery technique uses IEEE 802.11 management frames to inform users about network status. There are various management frames and this technique makes use of probe request frames and probe response frames.

Mobile devices can send probe requests to advertise their presence and seek association with access points. A probe response frame has nearly the same format as a beacon frame and an access point can use the probe response frame to reply to probe requests. The system can overload probe request frames by reclaiming unused bytes of the SSID field 402, or the rates field 404. For example the system may add approximately 280 bytes of information.

FIGS. 5A-5B presents a flow chart illustrating an exemplary process for challenge response discovery, in accordance with an embodiment of the present invention. Embodiments of the present invention are not limited to the operations depicted in FIGS. 5A-5B, and some embodiments may perform the operations of FIGS. 5A-5B in a different order or with operations that vary from that depicted in FIGS. 5A-5B.

With this technique, the mobile device uses WiFi probe requests to challenge WiFi access points to prove Internet connectivity (and possibly other information) prior to establishing a full Internet connection. Access points may reply to challenges by adding more information into their WiFi probe responses. Mobile devices do not need to connect to access points before verifying Internet connectivity, and access point cannot forge fake Internet connectivity responses.

The input for this technique can include a set of servers S, a value k indicating the number of servers to select randomly from a stored list of servers S, a function f( ), and a maximum timeout time period TMax. The output for this technique may be 1 indicating success in verifying the Internet connectivity, −1 indicating failure in verifying Internet connectivity, or 0 indicating an incompatible result.

As depicted in FIG. 5, a mobile device initially sets timeout to the value of currentTime (operation 502). The mobile device then selects k servers $\{serverURL\}_k$ at random from a locally stored list (e.g., or set) of servers S (operation 505). The mobile device may send a challenge request C to the access point using a probe request frame as follows: C=<$\{serverURL\}_k$, f( ), $\{Enc[RND]_{Pbk}\}_k$> where $\{serverURL\}_k$ represents the URLs of k web servers. $P_{bk}$ is the public key of serverURL k (e.g., public key of a respective server associated with serverURL k). RND is a random number, and $\{Enc[RND]_{Pbk}\}_k$ are k asymmetric encryptions using serverURL k's public keys $P_{bk}$ (e.g., public key of a respective server associated with serverURL k) and f(x) is a function, e.g., f(x)=x+1 (operation 506).

That is, the mobile device encrypts a random value using the public key of a respective server, challenges the server to decrypt the encrypted value and perform a computation with the value to obtain a result, and encrypt and send the result back to the mobile device. In some embodiments, the mobile device may send different random numbers for each server, and retain data associating each server with a respective random number.

The access point may forward challenge request C to the k servers (e.g., servers associated with the serverURLs) (operation 508). In some embodiments, the access point may remove an IP address and/or user agent data and/or other information from the request.

Each serverURL k decrypts the messages (e.g., challenge requests), obtains RND, computes f(RND), and encrypts f(RND) (e.g., $Enc[f(RND)]_{Pbk}$) and sends the resulting message $R_k$=<$serverURL_k$, $Enc[f(RND)]_{Pbk}$> back to the access point (operation 510).

The access point forwards $R_k$ that the access point receives from each server to the mobile device inside a probe response frame alongside the ToS and payment website (e.g., for captive portal), thus proving the Internet connection is active:

ProbeResponse=$R_k$‖ToS‖paymentURL(operation 512).

The mobile device then performs the following operations expressed in pseudocode:

```
If (mobile device receives stuffed frame) and (timeout<TMax) then
    temp = Enc[f(RND)]_Pbk
    If R_k[Enc[f(RND)]_Pbk] == temp then
        Return 1 //Success
    Else
        Return −1 //Fail
Else If (mobile device did not receive stuffed frame) and (timeout<TMax) then
    Return to operation 504
Else if (timeout>=TMax)
    Return 0 //Incompatible
```

That is, the mobile device determines if the mobile device receives a stuffed frame and timeout<TMax (operation 514). If the mobile device receives a stuffed frame and timeout<TMax then the mobile device sets the value of temp to be $Enc[f(RND)]_{Pbk}$ (operation 516). The mobile device then determines if $R_k[Enc[f(RND)]_{Pbk}]$ (e.g., the value of $Enc[f(RND)]_{Pbk}$ in $R_k$) is equal to temp (operation 518). If $R_k[Enc[f(RND)]_{Pbk}]$ is equal to temp then the method is successful and, in some embodiments, the method (e.g., procedure or function) may return a value of 1 to indicate success (operation 520). If $R_k[Enc[f(RND)]_{Pbk}]$ is not equal to temp then the method is not successful and, in some embodiments, the method (e.g., procedure or function) may return a value of −1 to indicate failure (operation 522).

If the mobile device does not receive a stuffed frame and timeout<TMax (operation 524), then the process continues by returning to operation 504 (operation 526). If the mobile device determines that timeout>=TMax (operation 528), then the method has timed out, and, in some embodiments, the method (e.g., procedure or function) may return a value of 0 to indicate an incompatible result (operation 530).

Security is guaranteed by the challenge-response protocol. User privacy is guaranteed by contacting a series of servers instead of systematically the same one. There are many alternative challenge-response approaches. In one embodiment, the mobile device requests the access point to perform a DNS lookup with f( )="what is the IP address of a specific server," where RND contains the domain name and is encrypted for the server (e.g., DNS server) associated with a serverURL to decrypt only. Assuming the mobile device already has information regarding the IP address of that domain name from a previous lookup, the access point requests the server (e.g., DNS server) associated with serverURL to decrypt RND and obtain the correct IP.

In some embodiments, the server k encrypts f(RND) using a public key provided by the mobile client and forwarded to the server k by the access point in the message $C=<\{Pbk_m, serverURL\}_k, f(\ ), \{Enc[RND]_{Pbk}\}_k>$. For verification, the mobile device simply decrypts the received value of f(RND) and checks whether it is correctly computed. This embodiment is especially useful if randomized public key encryption is used either by the mobile client or by the servers or both.

In some embodiments, servers associated with serverURLs (e.g., URLs of multiple servers) may be passively involved. For example, the challenge can be $C=<\{serverURL\}_k, f(RND), \{Enc[RND]_{Pb}\}_k>$ where RND is revealed to the access point, and the expected response is $R=<Enc[f(RND)]_{Pb}>$. In this case, the access point does not need to request a server associated with a serverURL to compute the response, and can instead generate the response by fetching a public key $P_b$ from the server associated with the serverURL. This improves user privacy, but raises security concerns since the access point can cheat this system.

In some embodiments, the challenge response discovery technique may be used to verify pricing information or the quality of the ToS. In this case, f( )="Is the ToS of access point privacy conscious" and RND is a link to the ToS.

In some embodiments, the encryption mechanism may be based on symmetric keys.

Active Discovery with Set Diversity

Figure 6:
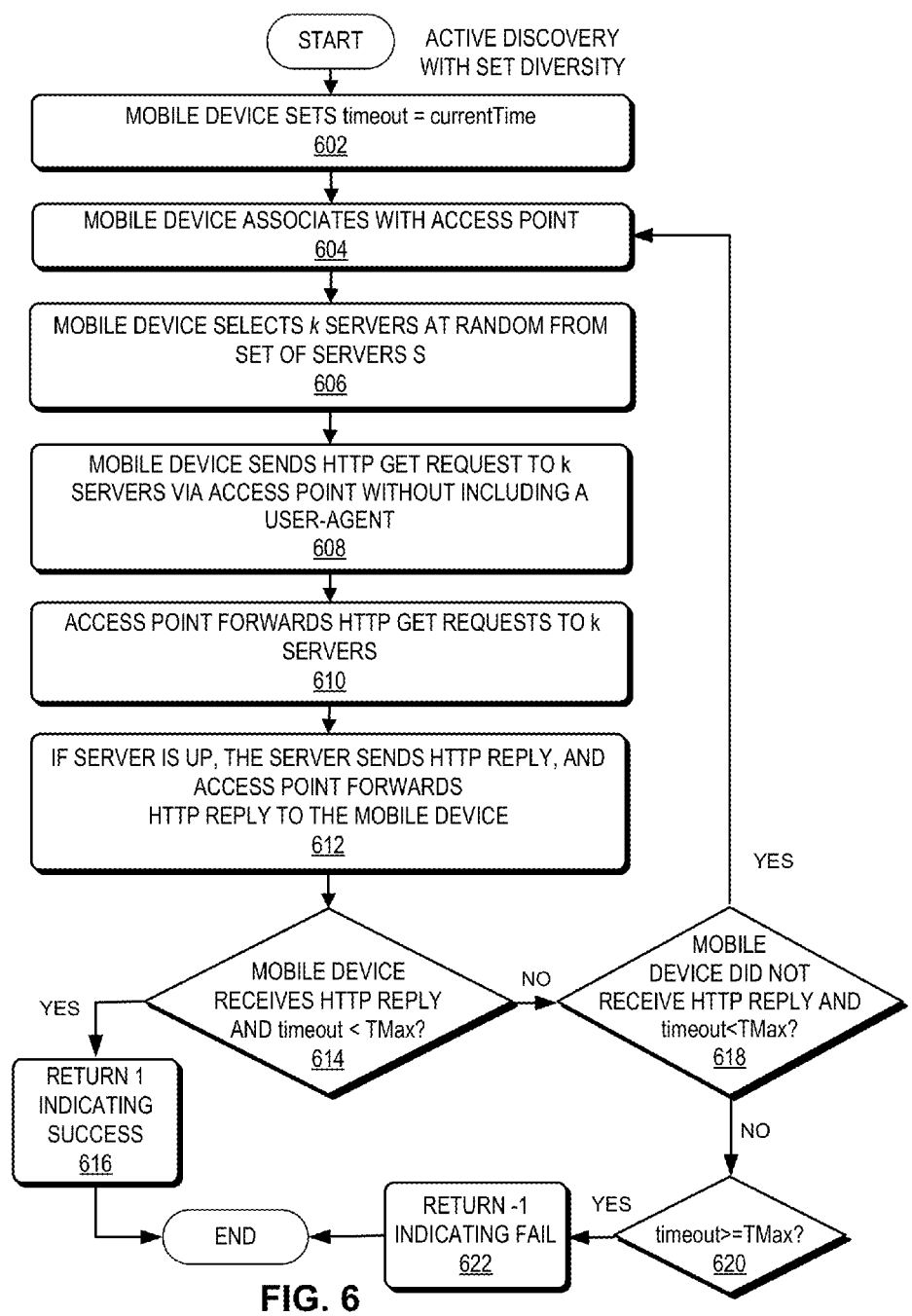
FIG. 6 presents a flow chart illustrating an exemplary process for active discovery with set diversity, in accordance with an embodiment of the present invention.

FIG. 6 presents a flow chart illustrating an exemplary process for active discovery with set diversity, in accordance with an embodiment of the present invention. Embodiments of the present invention are not limited to the operations depicted in FIG. 6, and some embodiments may perform the operations of FIG. 6 in a different order or with operations that vary from that depicted in FIG. 6.

This technique may use crowdsourcing to determine (or create) a set of servers that help verify Internet connectivity. In other words, the mobile device communicates with a pool of network connectivity servers instead of using the same server over and over again. Since this technique uses a crowdsourced pool of servers, some servers may be down (e.g., not currently online). As a result, it may be advantageous for the mobile device to contact k servers at once (e.g., simultaneously or within a short predetermined period of time) to reduce chances of false negatives.

As depicted in FIG. 6, a mobile device sets the value of timeout to a current time (e.g., set timeout=currentTime) (operation 602). The mobile device then associates with access point (operation 604). The mobile device may select k servers at random from a set of servers S (operation 606). The mobile device may send HTTP GET request to k servers via the access point without including a user agent (operation 608).

The access point then forwards the HTTP GET requests to k servers (operation 610). In some embodiments, the access point may remove user agent data (e.g., indicating which browser the user is using), IP address, and other information from the requests. If a server is up and operating, the server may send a HTTP REPLY, and the access point may forward the HTTP REPLY to the mobile device (operation 612).

The mobile device may then perform the following operations expressed in pseudocode below:

If (mobile device receives HTTP REPLY) and (timeout<TMax) then
    Return 1 // Success
Else If (mobile device did not receive HTTP REPLY) and (timeout<TMax) then
    Return to operation 604.
Else If (timeout>=TMax)
    Return −1 // Fail That is, the mobile device determines if the mobile device receives HTTP REPLY from any of the servers and timeout<TMax (operation 614). If the mobile device receives HTTP REPLY and timeout<TMax then the process (e.g., procedure or function) returns a value of 1 and Internet connectivity verification is a success (operation 616).

Otherwise, the mobile device determines if the mobile device did not receive HTTP REPLY and timeout<TMax (operation 618). If the mobile device did not receive HTTP REPLY and timeout<TMax, then the process continues by returning to operation 604. Otherwise, the mobile device then determines if timeout>=TMax (operation 620). If timeout>=TMax then the process terminates with a failure result and the process (e.g., a procedure or function) may return the value of −1 (operation 622).

With this technique, although a user's IP address is revealed to several servers, servers individually learn much less about users querying for Internet connectivity. Assuming non-collusion between the servers, this approach provides better privacy than current deployments. In the worst case, the mobile device will contact as many servers as possible within the TMax time period. Thus, one can adjust TMax to limit the privacy footprint. Unfortunately, this technique requires users to first connect to access points before receiving the desired information, so this technique is arguably not faster than existing approaches. In addition, with this technique, the access point can still intercept messages and lie about Internet connectivity (e.g., not more secure). The challenge response discovery and passive network discovery techniques may provide better security, privacy, and speed.

The system may also choose servers sequentially instead of randomly. For example, k=1 corresponds to the mobile device contacting servers sequentially, and k>1 corresponds to the mobile device contacting multiple servers in parallel.

Exemplary Mobile Device

Figure 7:
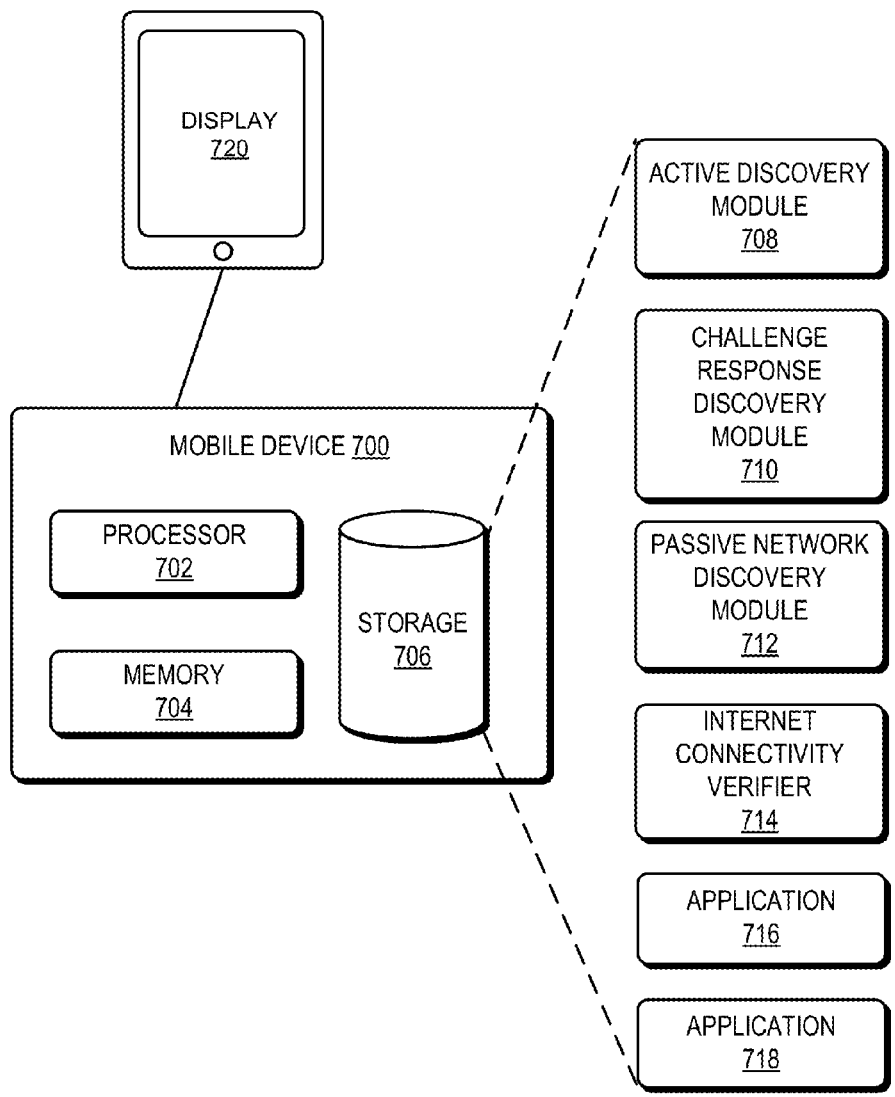
FIG. 7 presents an exemplary mobile device in an Internet connectivity verification system, in accordance with an embodiment of the present invention.

FIG. 7 presents a exemplary mobile device in an Internet connectivity verification system, in accordance with an embodiment of the present invention. In FIG. 7, mobile device 700 includes a processor 702, a memory 704, and a storage device 706. Storage device 706 stores programs to be executed by processor 702. Specifically, storage device 706 stores an active discovery module 708, a challenge response discovery module 710, a passive network discovery module 712, and an Internet connectivity verifier 714, as well as other applications, such as applications 716 and 718. Mobile device 700 may be any computing device, and may be coupled to a display 720 and an optional keyboard and pointing device.

Active discovery module 708 may verify Internet connectivity by contacting multiple servers with an active discovery technique. Challenge response discovery module 710 may verify Internet connectivity by using a challenge response discovery technique. Passive network discovery module 712 may verify Internet connectivity by using a passive network discovery technique. Internet and connectivity verifier 714 may verify Internet connectivity by using a combination of the different modules and techniques.

Exemplary Access Point

Figure 8:
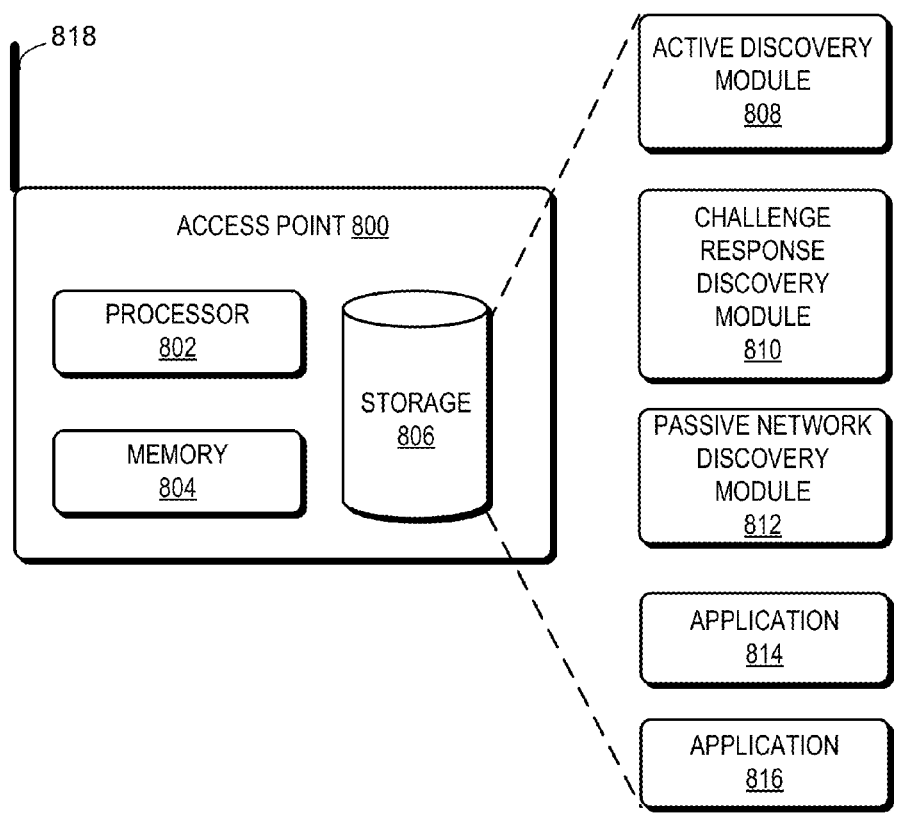
FIG. 8 presents an exemplary access point in an Internet connectivity verification system, in accordance with an embodiment of the present invention.

FIG. 8 presents a exemplary access point in an Internet connectivity verification system, in accordance with an embodiment of the present invention. The wireless access point can be a networking hardware device that allows wireless devices to connect to a wired network using Wi-Fi or related standards. The access point may be a standalone device connected to a router, or the access point can also be an integral component of the router.

In FIG. 8, access point 800 may include a processor 802, a memory 804, and a storage device 806. Storage device 806 stores programs to be executed by processor 802. Specifically, storage device 806 stores an active discovery module 808, a challenge response discovery module 810, and a passive network discovery module 812, as well as other applications, such as applications 814 and 816. Access point 800 may also include an antenna 818 to broadcast the wireless signal.

The modules and other components of access point 800 can be implemented as hardware modules, including, but not limited to, application-specific integrated circuit (ASIC) chips, field-programmable gate arrays (FPGAs), and other programmable-logic devices. Further, some access point implementations may include any combination of modules to perform the same functions as the depicted modules. In some embodiments, an external controller device that includes a processor, memory, and storage may control one or more access points.

Active discovery module 808 may facilitate Internet connectivity verification by forwarding communications from a client mobile device to multiple servers and forwarding replies from servers to the mobile device according to an active discovery technique.

Challenge response discovery module 810 may facilitate Internet connectivity verification with a challenge response discovery technique. Challenge response discovery module 810 may forward a challenge request to multiple servers and forward the response received from the multiple servers to the mobile device.

Passive network discovery module 812 may facilitate Internet connectivity verification with a passive network discovery technique. Passive network discovery module 812 may retrieve signed timing information from a server and overload WiFi beacon frames to include the signed timing information.

Exemplary Server

Figure 9:
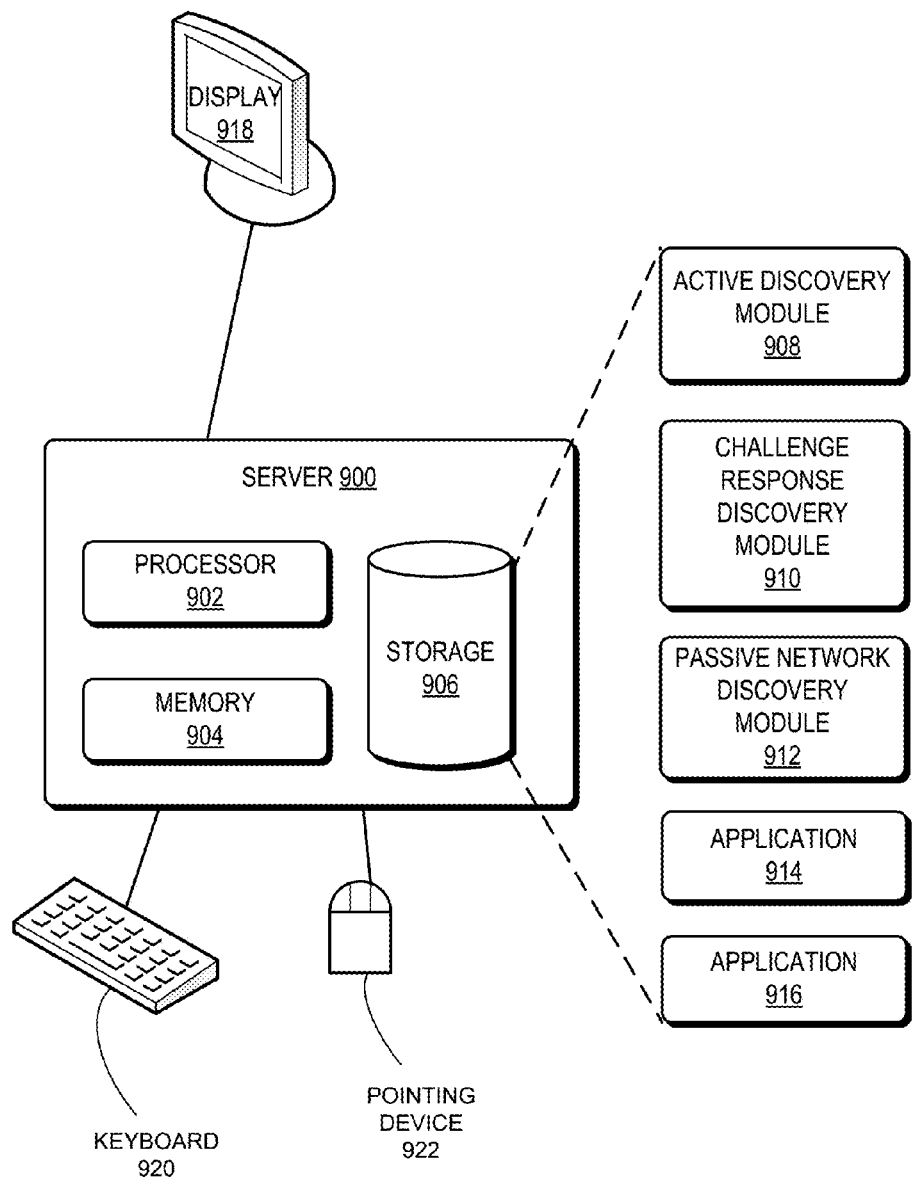
FIG. 9 presents an exemplary server in an Internet connectivity verification system, in accordance with an embodiment of the present invention.

FIG. 9 presents an exemplary server 900 in an Internet connectivity verification system, in accordance with an embodiment of the present invention. In FIG. 9, server 900 includes a processor 902, a memory 904, and a storage device 906. Storage device 906 stores programs to be executed by processor 902. Specifically, storage device 906 may store an active discovery module 908, a challenge response discovery module 910, a passive network discovery module 912, as well as other applications, such as applications 914 and 916. Server 900 may be coupled to an optional display 918, a keyboard 920, and a pointing device 922.

Active discovery module 908 may facilitate Internet connectivity verification by performing operations according to an active discovery technique. For example, active discovery module 908 may receive a HTTP GET request and respond with an HTTP REPLY.

Challenge response discovery module 910 may facilitate Internet connectivity verification by performing operations according to a challenge response discovery technique. For example, challenge response discovery module 910 may respond to a challenge request from a mobile device and send a message with the response to the challenge request back to the mobile device.

Passive network discovery module 912 may facilitate Internet connectivity verification by performing operations according to a passive network discovery technique. For example, passive network discovery module 912 may publish signed timing information and/or generate a message with HMAC.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-executable method for performing passive network discovery to verify Internet connectivity of a mobile device, comprising:
 setting, by a mobile device, a timeout variable to a value equal to a current time;
 receiving, by the mobile device, a beacon frame from an access point of a WiFi service;

determining, by the mobile device, that the beacon frame includes signed timing information of a server and the value of the timeout variable is less than a maximum time;

determining a decrypted time value by using a public key of the server to decrypt an encrypted time value extracted from the signed timing information;

determining that the decrypted time value is equal to a time value extracted from the signed timing information and that the time value is greater than the current time minus a time window; and determining, by the mobile device, that the Internet connectivity verification for the WiFi service is successful.

2. The method of claim 1, wherein the access point obtains the signed timing information from the server and broadcasts the signed timing information in the beacon frame.

3. The method of claim 1, further comprising performing challenge response discovery by executing the following operations:

setting, by the mobile device, the timeout variable to a value equal to the current time;

selecting, by the mobile device, a subset of servers from a stored list of servers;

sending, by the mobile device, a challenge request to the access point using a probe request frame, wherein the probe request frame includes a number encrypted using a public key of a respective server of the subset of servers;

forwarding, by the access point, the challenge request to the subset of servers, wherein a respective server of the subset of servers applies a function indicated in the challenge request to the number indicated in the challenge request to generate an encrypted value to be included in a result message returned to the access point;

forwarding, by the access point, the result message to the mobile device after receiving the result message from the respective server; and determining, by the mobile device, based on the encrypted value in the result message, that the Internet connection has been successfully verified.

4. The method of claim 3, wherein the access point removes user agent information from the challenge request.

5. The method of claim 1, further comprising performing challenge response discovery by executing the following operations:

sending, by the mobile device, a request to perform a DNS lookup to a DNS server via the access point, wherein the request includes a domain name encrypted using a public key of the DNS server;

forwarding, by the access point, the request to the DNS server, wherein the DNS server decrypts the encrypted domain name, determines a numeric IP address corresponding to the domain name, and sends the numeric IP address to the access point for forwarding to the mobile device; and determining, by the mobile device, that the Internet connection has been successfully verified based on receiving the numeric IP address.

6. The method of claim 1, further comprising performing active discovery by executing the following operations:

setting, by the mobile device, the timeout variable to a value equal to the current time;

selecting randomly, by the mobile device, a subset of servers from a plurality of servers;

sending, by the mobile device, a HTTP GET request without including a user agent to each server of the randomly selected subset of servers via the access point;

forwarding, by the access point, the HTTP GET request to each server of the randomly selected subset of servers, wherein a respective server sends an HTTP REPLY to the access point and the access point forwards the HTTP REPLY to the mobile device; and determining, by the mobile device, that the Internet connectivity verification is successful based on receiving the HTTP REPLY and the value of the timeout being less than a maximum time.

7. The method of claim 1, wherein the beacon frame comprises the signed timing information of the server, terms of service, and a URL for a payment website.

8. The method of claim 1, wherein the server publishes signed timing information at regular intervals.

9. A non-transitory computer-readable storage medium storing instructions which when executed by a computer cause the computer to perform a method for passive network discovery to verify Internet connectivity of a mobile device, the method comprising:

setting, by a mobile device, a timeout variable to a value equal to a current time;

receiving, by the mobile device, a beacon frame from an access point of a WiFi service;

determining, by the mobile device, that the beacon frame includes signed timing information of the server and the value of the timeout variable is less than a maximum time;

determining a decrypted time value by using a public key of the server to decrypt an encrypted time value extracted from the signed timing information;

determining that the decrypted time value is equal to a time value extracted from the signed timing information and that the time value is greater than the current time minus a time window; and determining, by the mobile device, that the Internet connectivity verification for the WiFi service is successful.

10. The storage medium of claim 9, wherein the access point obtains the signed timing information from the server and broadcasts the signed timing information in the beacon frame.

11. The storage medium of claim 9, wherein the method further comprises performing challenge response discovery by executing the following operations:

setting, by the mobile device, the timeout variable to a value equal to the current time;

selecting, by the mobile device, a subset of servers from a stored list of servers;

sending, by the mobile device, a challenge request to the access point using a probe request frame, wherein the probe request frame includes a number encrypted using a public key of a respective server of the subset of servers;

forwarding, by the access point, the challenge request to the subset of servers, wherein a respective server of the subset of servers applies a function indicated in the challenge request to the number indicated in the challenge request to generate an encrypted value to be included in a result message returned to the access point;

forwarding, by the access point, the result message to the mobile device after receiving the result message from the respective server; and determining, by the mobile device, based on the encrypted value in the result message, that the Internet connection has been successfully verified.

12. The storage medium of claim 11, wherein the access point removes user agent information from the challenge request.

13. The storage medium of claim 9, wherein the method further comprises performing challenge response discovery by executing the following operations:
   sending, by the mobile device, a request to perform a DNS lookup to a DNS server via the access point, wherein the request includes a domain name encrypted using a public key of the DNS server;
   forwarding, by the access point, the request to the DNS server, wherein the DNS server decrypts the encrypted domain name, determines a numeric IP address corresponding to the domain name, and sends the numeric IP address to the access point for forwarding to the mobile device; and
   determining, by the mobile device, that the Internet connection has been successfully verified based on receiving the numeric IP address.

14. The storage medium of claim 9, wherein the method further comprises performing active discovery by executing the following operations:
   setting, by the mobile device, the timeout variable to a value equal to the current time;
   selecting randomly, by the mobile device, a subset of servers from a plurality of servers;
   sending, by the mobile device, a HTTP GET request without including a user agent to each server of the randomly selected subset of servers via the access point;
   forwarding, by the access point, the HTTP GET request to each server of the randomly selected subset of servers, wherein a respective server sends an HTTP REPLY to the access point and the access point forwards the HTTP REPLY to the mobile device; and
   determining, by the mobile device, that the Internet connectivity verification is successful based on receiving the HTTP REPLY and the value of the timeout being less than a maximum time.

15. A computing system comprising:
   one or more processors;
   a memory; and
   a non-transitory computer-readable medium coupled to the one or more processors storing instructions stored that, when executed by the one or more processors, cause the computing system to perform a method comprising:
   setting, by a mobile device, a timeout variable to a value equal to a current time;
   receiving, by the mobile device, a beacon frame from an access point of a WiFi service;
   determining, by the mobile device, that the beacon frame includes signed timing information of the server and the value of the timeout variable is less than a maximum time;
   determining a decrypted time value by using a public key of the server to decrypt an encrypted time value extracted from the signed timing information;
   determining that the decrypted time value is equal to a time value extracted from the signed timing information and that the time value is greater than the current time minus a time window; and
   determining, by the mobile device, that the Internet connectivity verification for the WiFi service is successful.

16. The computing system of claim 15, wherein the access point obtains the signed timing information from the server and broadcasts the signed timing information in the beacon frame.

17. The computing system of claim 15, wherein the method further comprises performing challenge response discovery by executing the following operations:
   setting, by the mobile device, the timeout variable to a value equal to the current time;
   selecting, by the mobile device, a subset of servers from a stored list of servers;
   sending, by the mobile device, a challenge request to the access point using a probe request frame, wherein the probe request frame includes a number encrypted using a public key of a respective server of the subset of servers;
   forwarding, by the access point, the challenge request to the subset of servers, wherein a respective server of the subset of servers applies a function indicated in the challenge request to the number indicated in the challenge request to generate an encrypted value to be included in a result message returned to the access point;
   forwarding, by the access point, the result message to the mobile device after receiving the result message from the respective server; and
   determining, by the mobile device, based on the encrypted value in the result message, that the Internet connection has been successfully verified.

18. The computing system of claim 17, wherein the access point removes user agent information from the challenge request.

19. The computing system of claim 15, wherein the method further comprises performing challenge response discovery by executing the following operations:
   sending, by the mobile device, a request to perform a DNS lookup to a DNS server via the access point, wherein the request includes a domain name encrypted using a public key of the DNS server;
   forwarding, by the access point, the request to the DNS server, wherein the DNS server decrypts the encrypted domain name, determines a numeric IP address corresponding to the domain name, and sends the numeric IP address to the access point for forwarding to the mobile device; and
   determining, by the mobile device, that the Internet connection has been successfully verified based on receiving the numeric IP address.

20. The computing system of claim 15, wherein the method further comprises performing active discovery by executing the following operations:
   setting, by the mobile device, the timeout variable to a value equal to the current time;
   selecting randomly, by the mobile device, a subset of servers from a plurality of servers;
   sending, by the mobile device, a HTTP GET request without including a user agent to each server of the randomly selected subset of servers via the access point;
   forwarding, by the access point, the HTTP GET request to each server of the randomly selected subset of servers, wherein a respective server sends an HTTP REPLY to the access point and the access point forwards the HTTP REPLY to the mobile device; and
   determining, by the mobile device, that the Internet connectivity verification is successful based on receiving the HTTP REPLY and the value of the timeout being less than a maximum time.

* * * * *